United States Patent [19]
Goto

[11] Patent Number: 5,572,011
[45] Date of Patent: Nov. 5, 1996

[54] FOCUS DETECTING METHOD AND DISTANCE MEASURING METHOD WITH A PLURALITY OF LIGHT FLUXES AND A CONTRAST OPERATION

[75] Inventor: Hisashi Goto, Yokohama, Japan

[73] Assignee: Olympus Optical Co., Ltd., Tokyo, Japan

[21] Appl. No.: 365,764

[22] Filed: Dec. 28, 1994

[30] Foreign Application Priority Data

Dec. 28, 1993 [JP] Japan ................... 5-350274

[51] Int. Cl.$^6$ .................................. G01J 1/20
[52] U.S. Cl. .................. 250/201.2; 250/201.7; 396/114; 396/125
[58] Field of Search .............. 250/201.2, 201.5, 250/201.7, 201.8, 204; 354/400, 402–409; 355/55, 56

[56] References Cited

U.S. PATENT DOCUMENTS

| | | | |
|---|---|---|---|
| 4,422,168 | 12/1983 | Ito et al. | 250/204 |
| 4,835,562 | 5/1989 | Norita et al. | 250/201.7 |

FOREIGN PATENT DOCUMENTS

| | | |
|---|---|---|
| 51-80223 | 7/1976 | Japan. |
| 55-118019 | 9/1980 | Japan. |
| 56-155909 | 12/1981 | Japan. |
| 58-106511 | 6/1983 | Japan. |
| 532733B2 | 8/1984 | Japan. |
| 59-155807 | 9/1984 | Japan. |
| 60-32012A | 2/1985 | Japan. |
| 63-127217 | 5/1988 | Japan. |
| 61-38382A | 5/1994 | Japan. |
| 6273664A | 9/1994 | Japan. |

*Primary Examiner*—Que T. Le
*Attorney, Agent, or Firm*—Watson Cole Stevens Davis, P.L.L.C.

[57] ABSTRACT

In an image pick-up device including an image forming lens, a focal condition of the image forming lens is detected by means of a focus detecting optical system including a condenser lens arranged near a predetermined focal plane of the image forming lens, a plurality of aperture stops which divides a light flux emanating from an object into a plurality of light fluxes, a plurality of image reforming lenses each corresponding to respective aperture stops and a plurality of light receiving element arrays each corresponding to respective image reforming lenses. Output characteristics of the light receiving element arrays are are expressed as three dimensional information, while an image position is expressed on X axis, a pupil position through which a light flux is transmitted is expressed on Y axis, and an intensity of light is expressed on Z axis. The three dimensional image is distorted on X-Z plane in accordance with defocus. A direction and an amount of defocus can be detected by detecting a direction and an amount of the distortion. The output characteristics of the light receiving element arrays are subjected to shift and sum operations to derive distributions of light intensity of parallax image summation. Then, operation for deriving a contrast is performed and a direction and an amount defocus are detected.

30 Claims, 24 Drawing Sheets

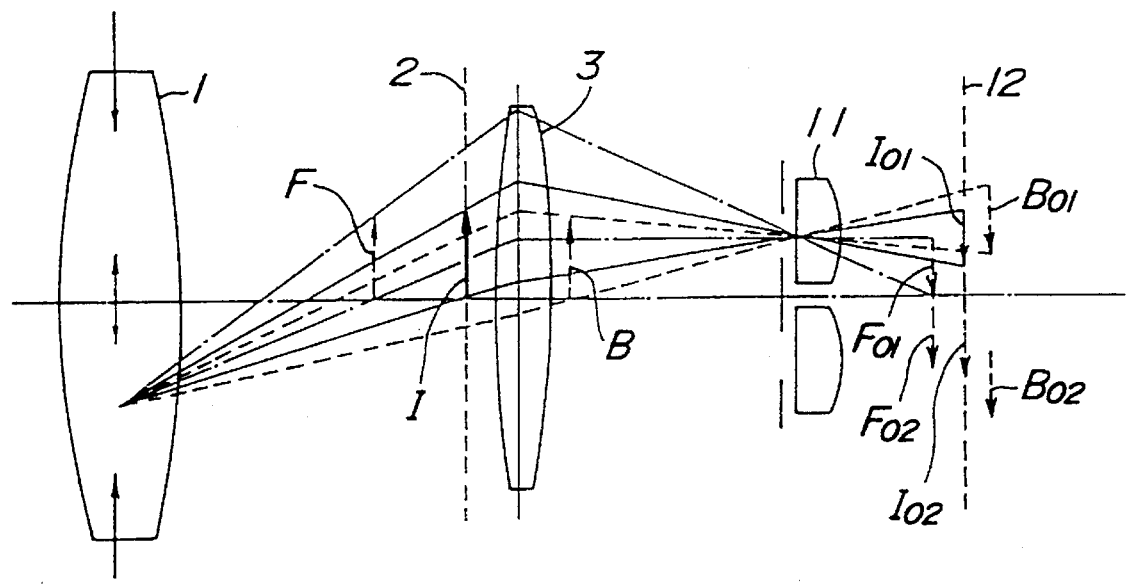
FIG_1
PRIOR ART

FIG_2
PRIOR ART
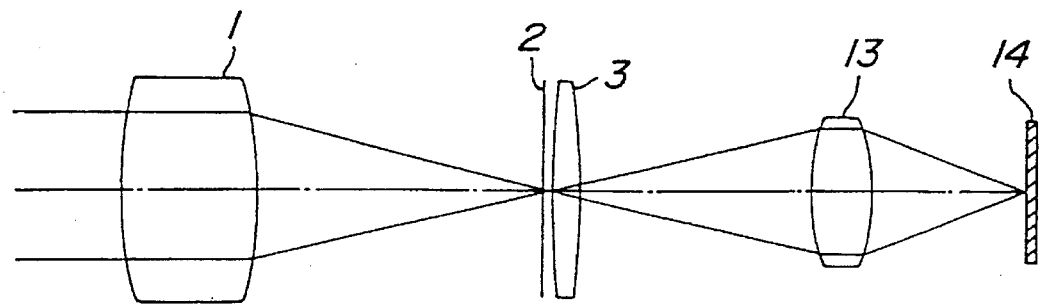
FIG_3
PRIOR ART
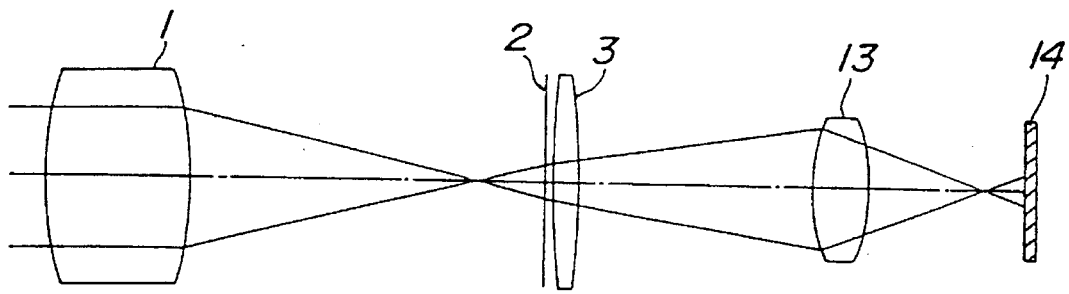

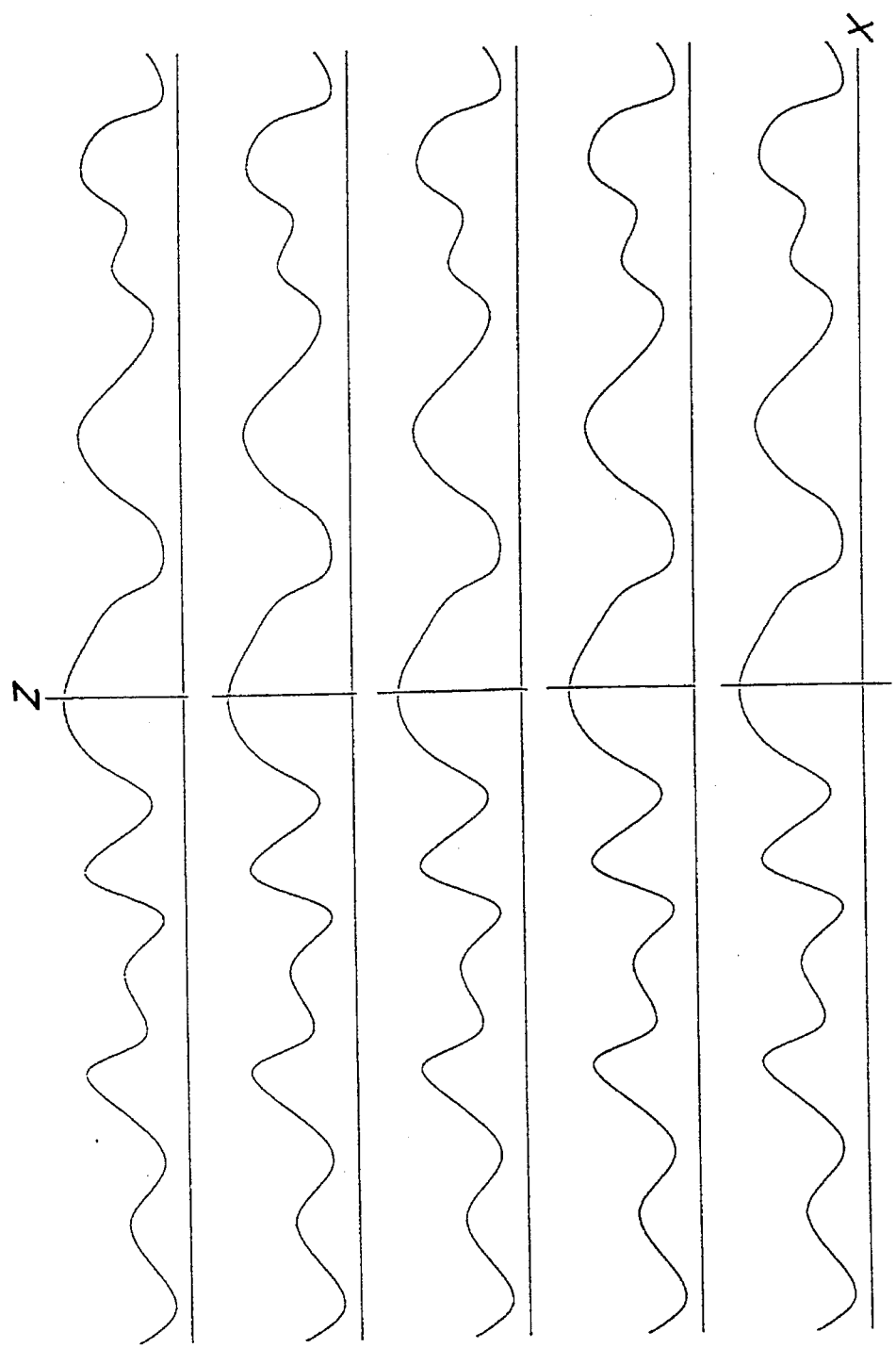

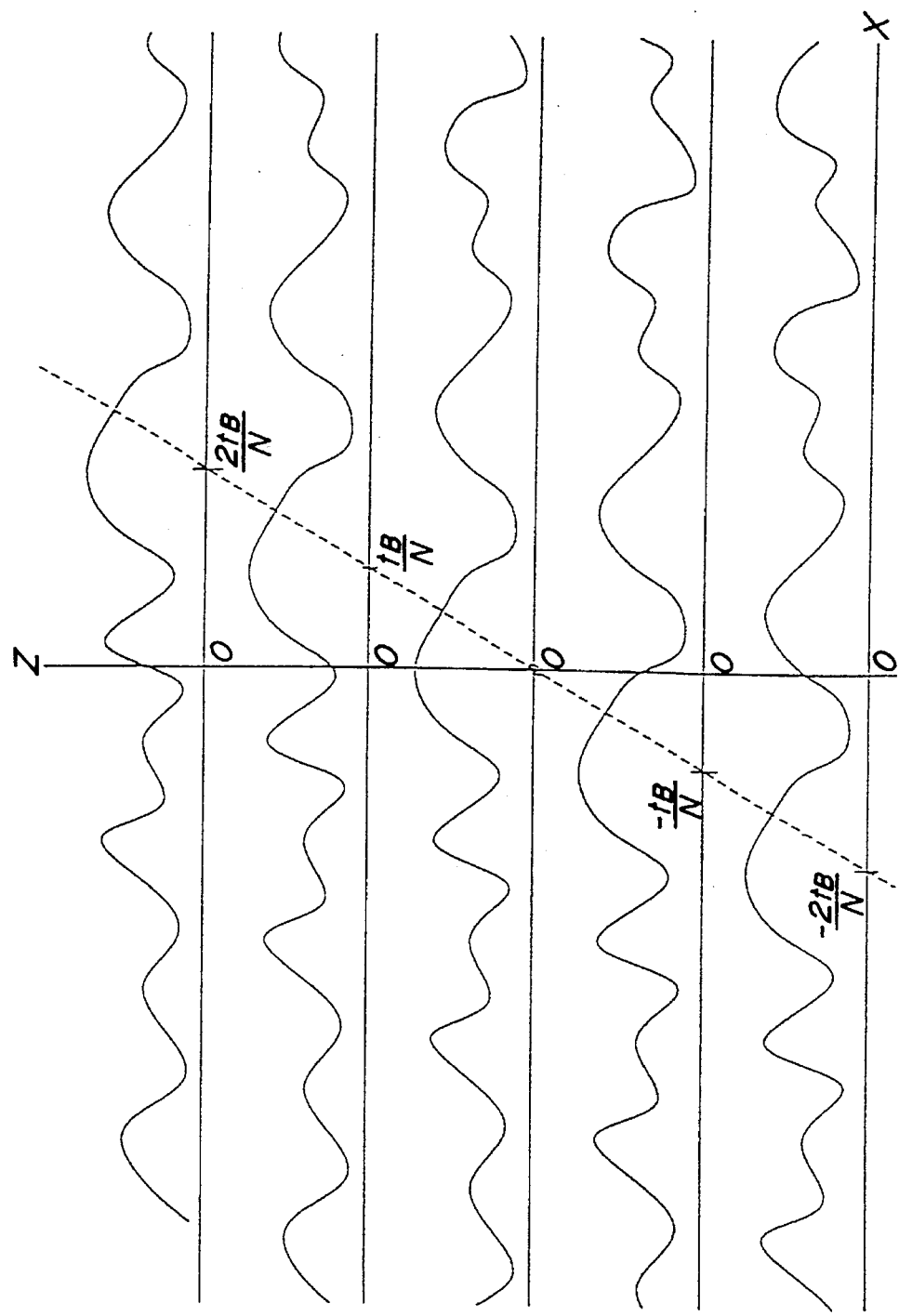

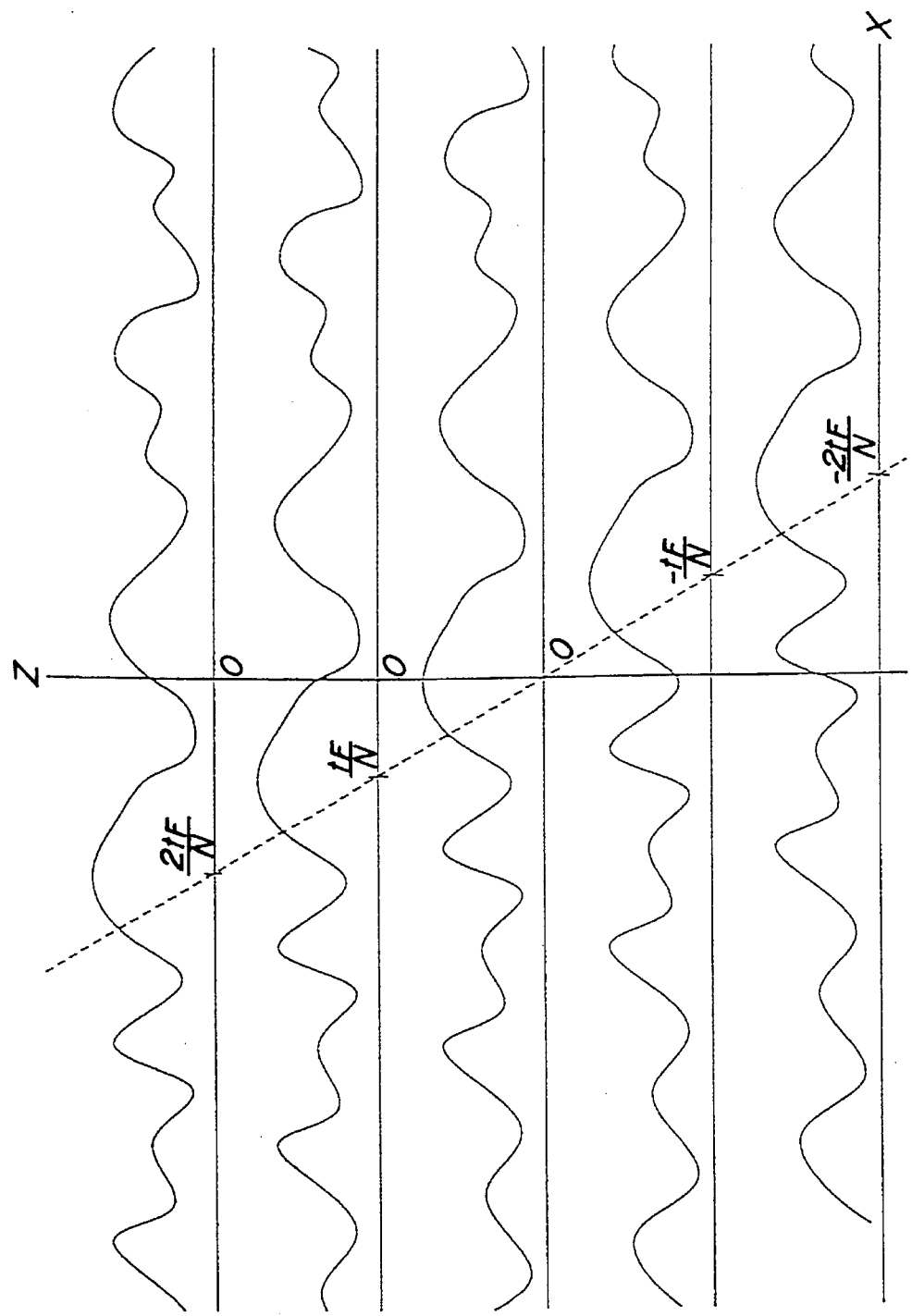

FIG_8
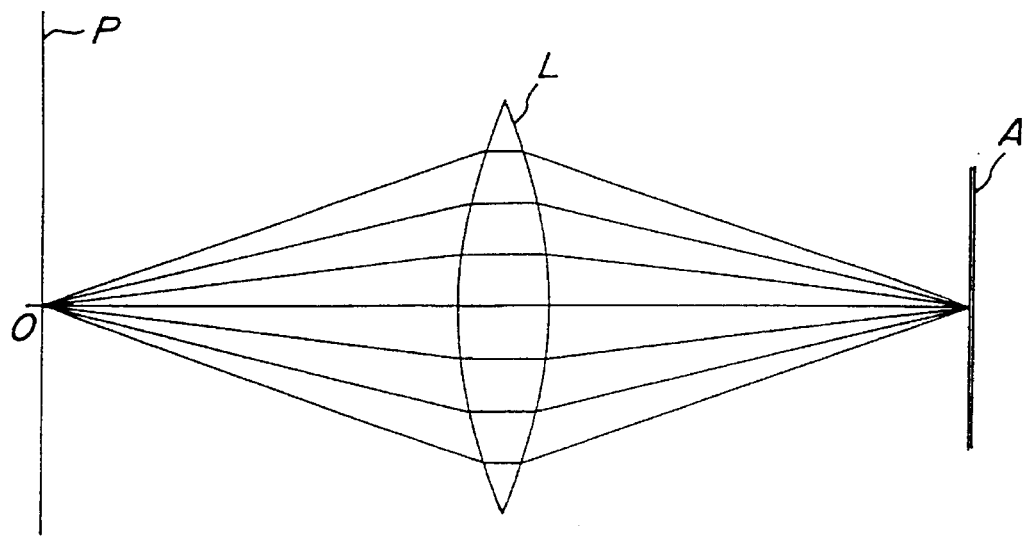
In-focused Condition
FIG_9
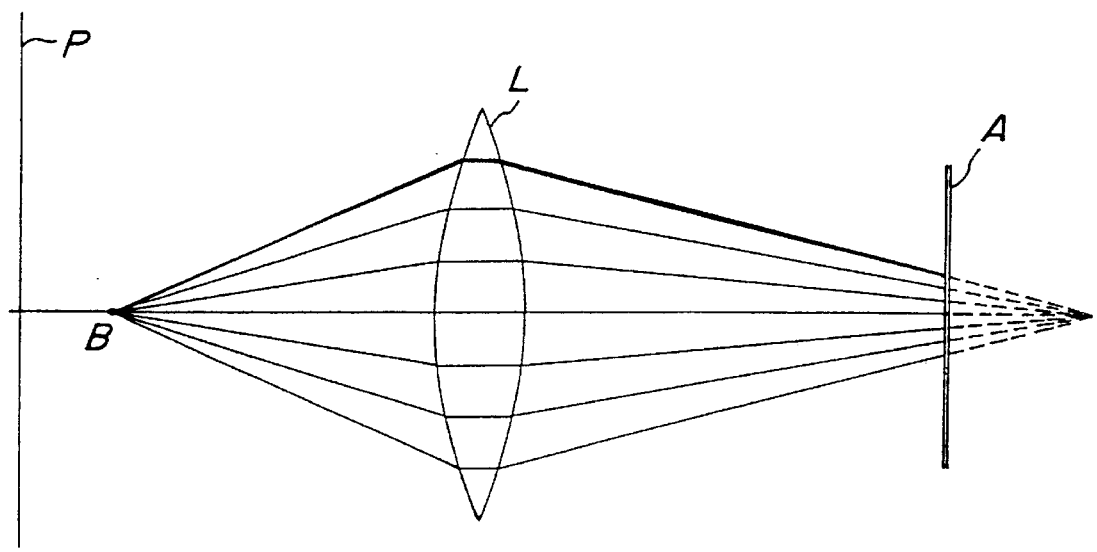
Backwardly Focused Condition

FIG_10
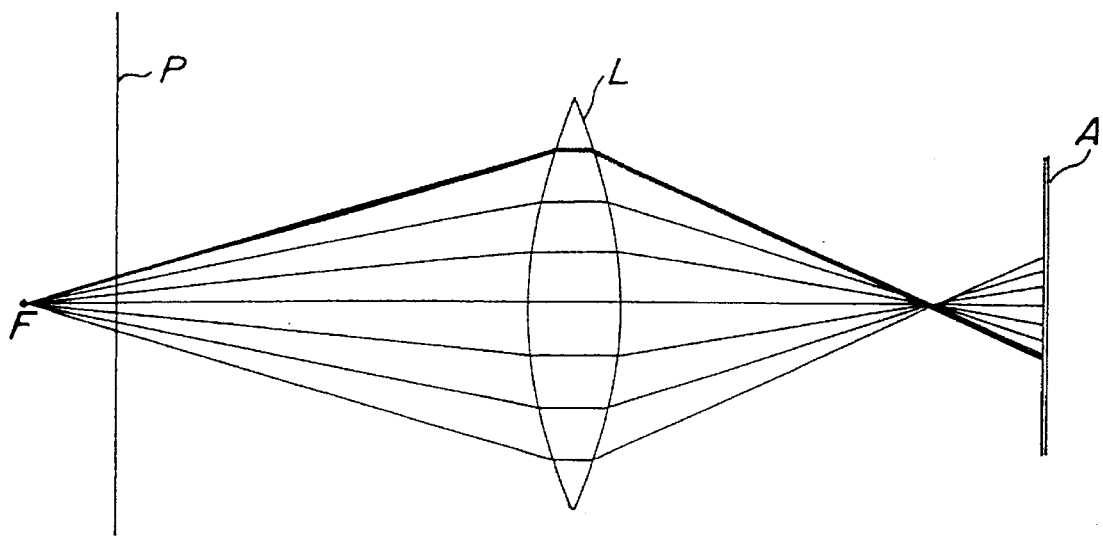
Forwardly Focused Condition
FIG_11
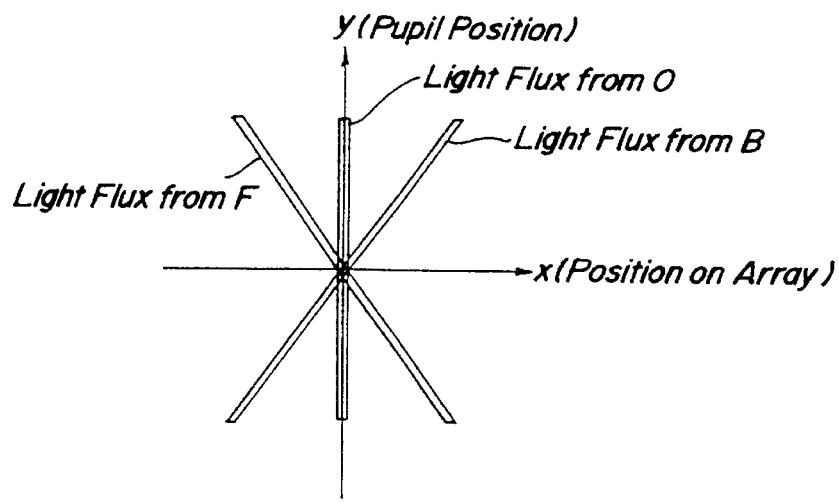

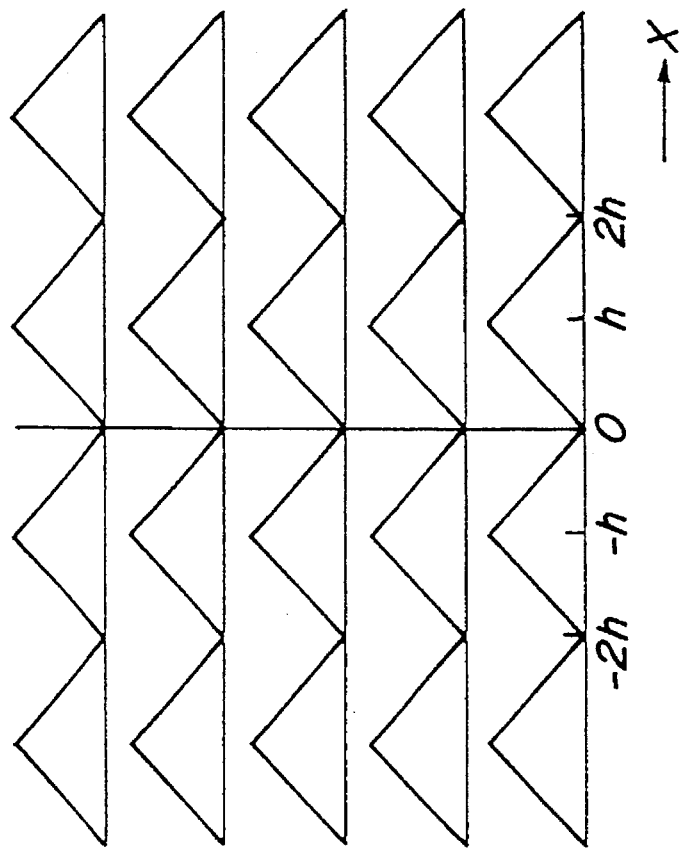
FIG.12A (Array I+2)
FIG.12B (Array I+1)
FIG.12C (Array I)
FIG.12D (Array I-1)
FIG.12E (Array I-2)

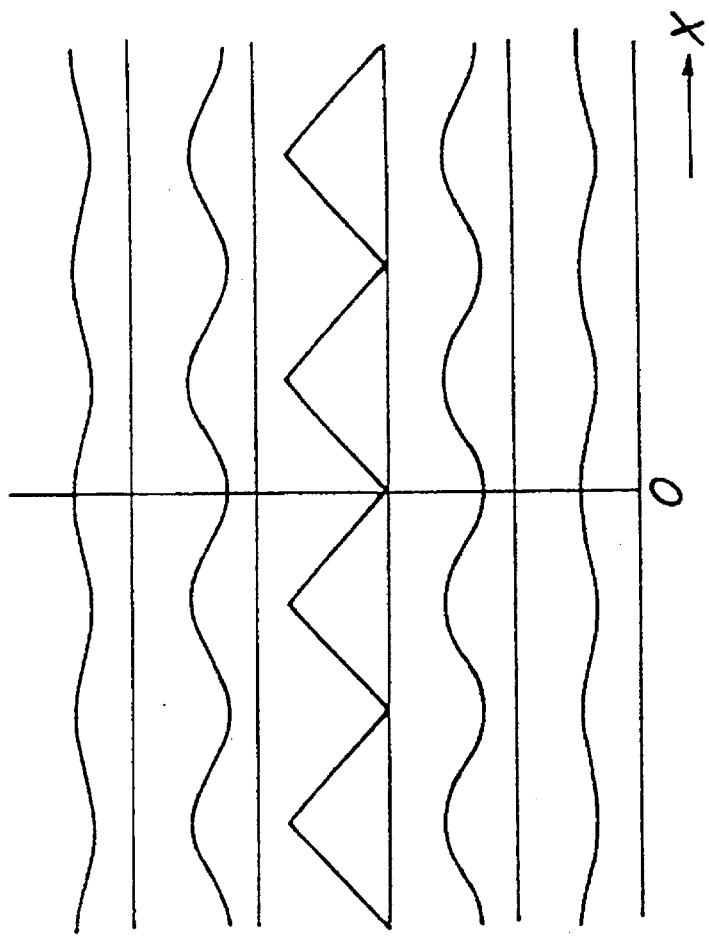

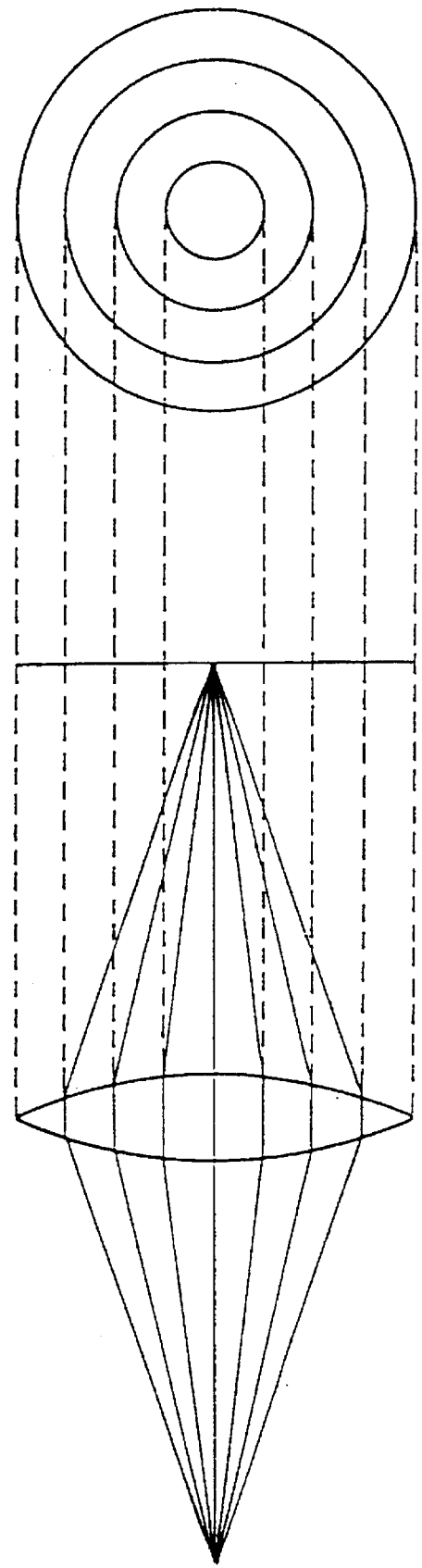
FIG_14

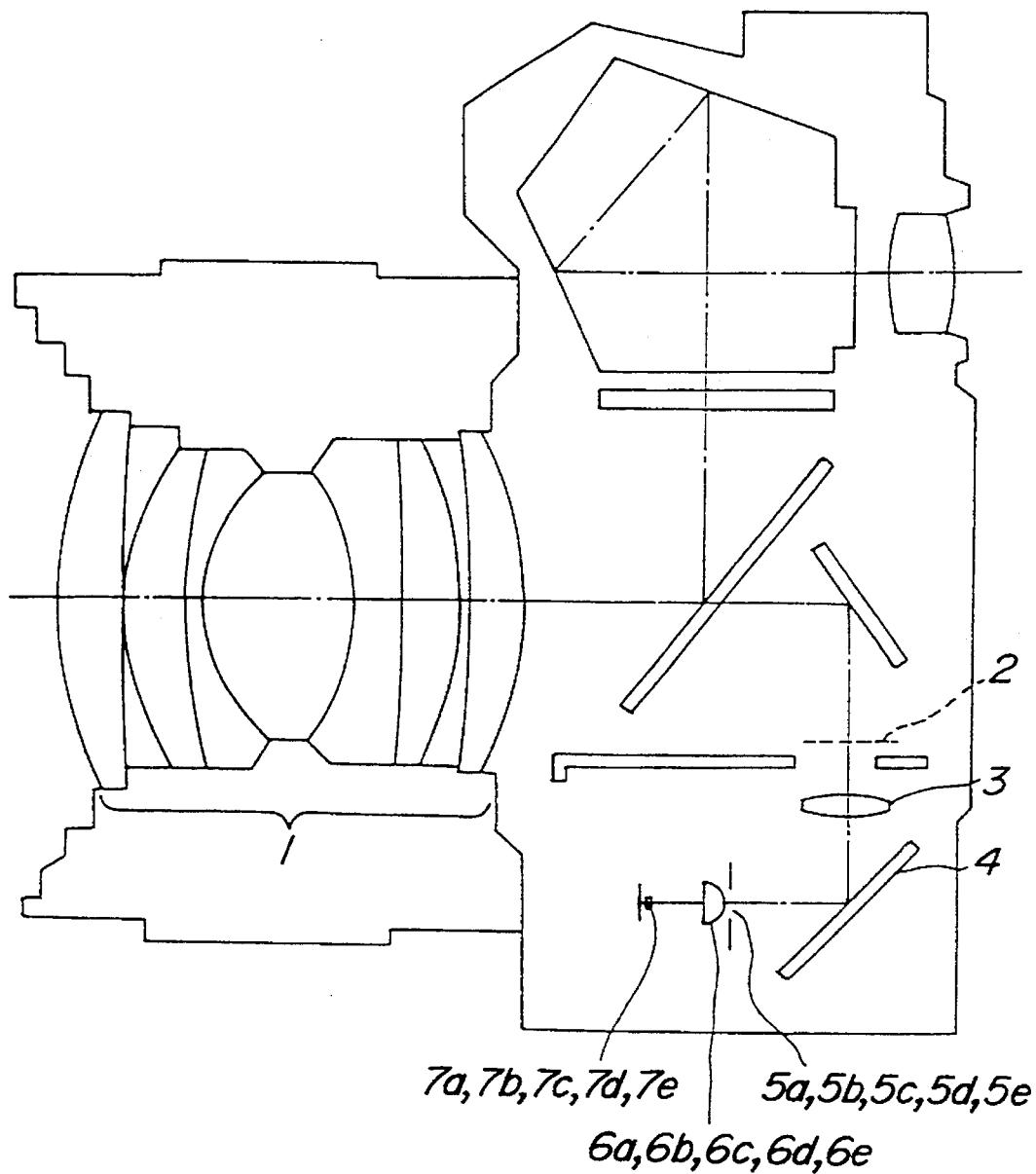

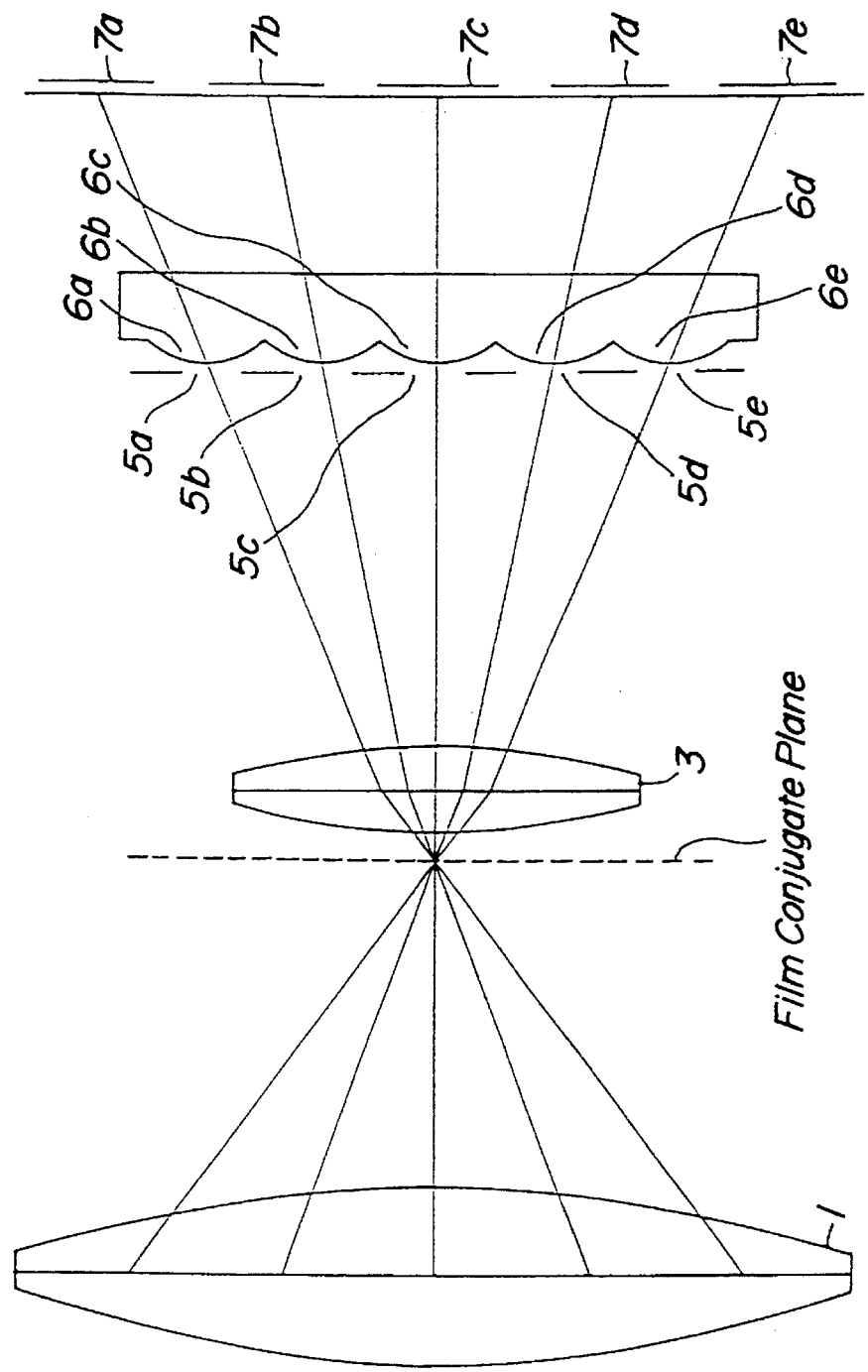

FIG_18

FIG_21

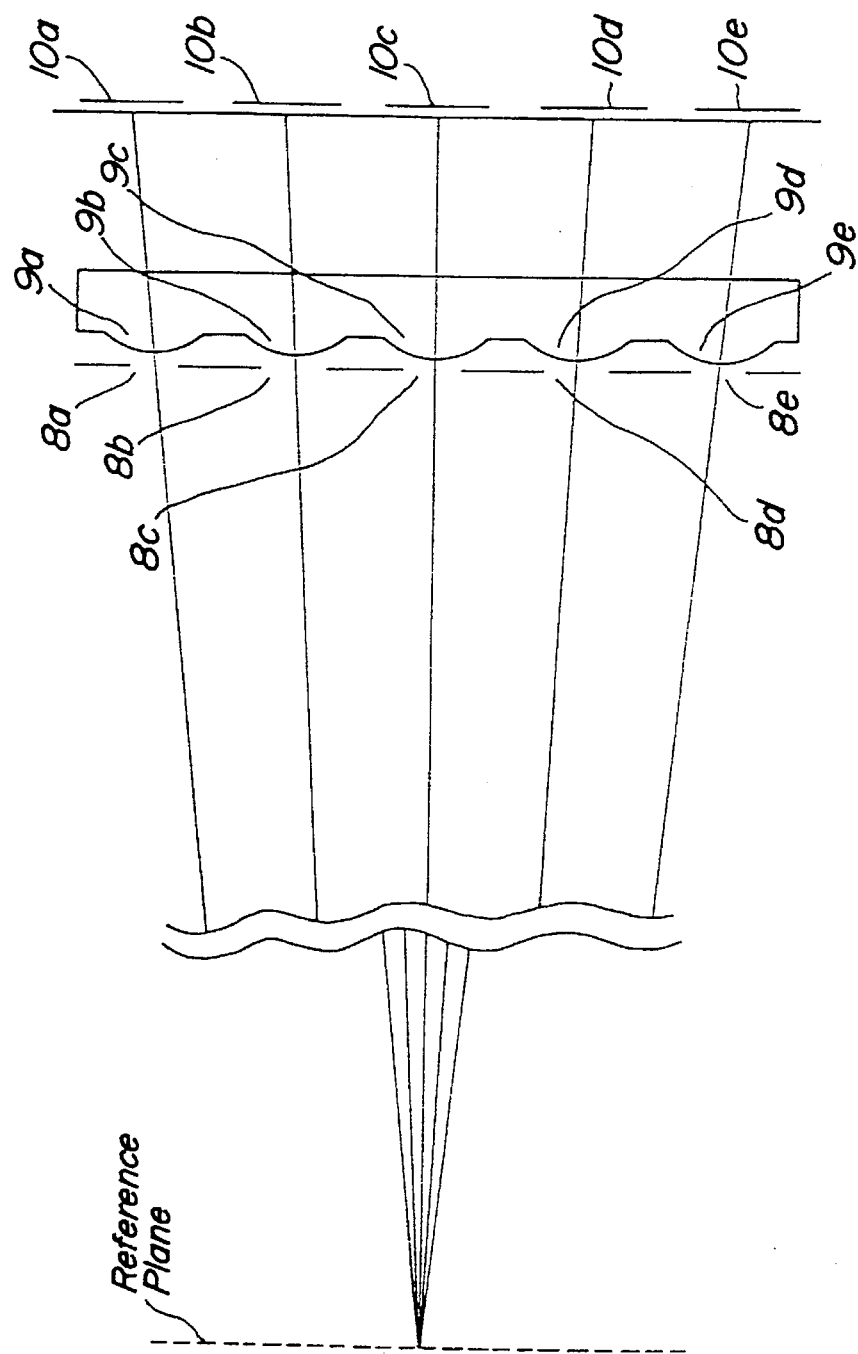

FIG._27A
FIG._27B
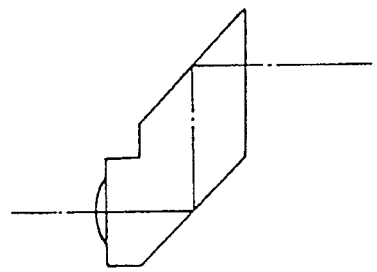
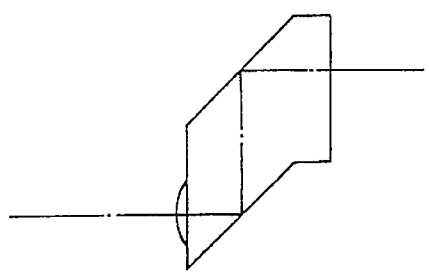
FIG._28
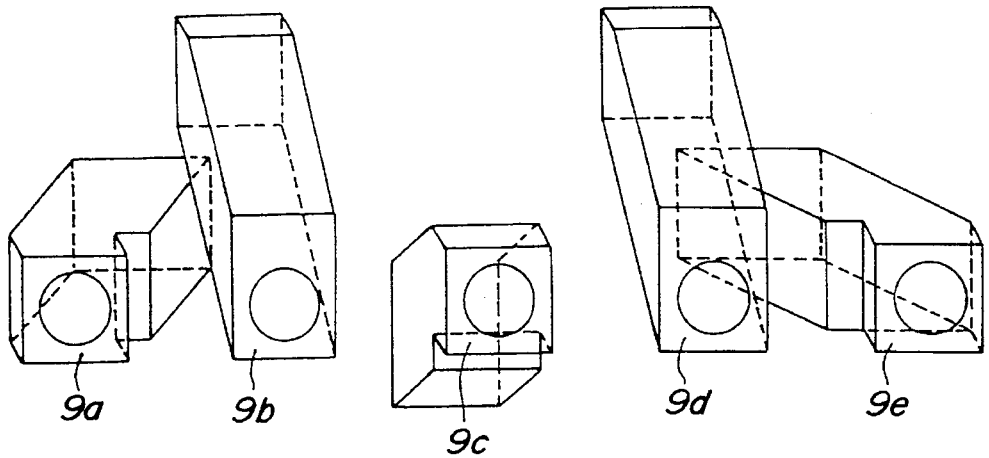
FIG._29
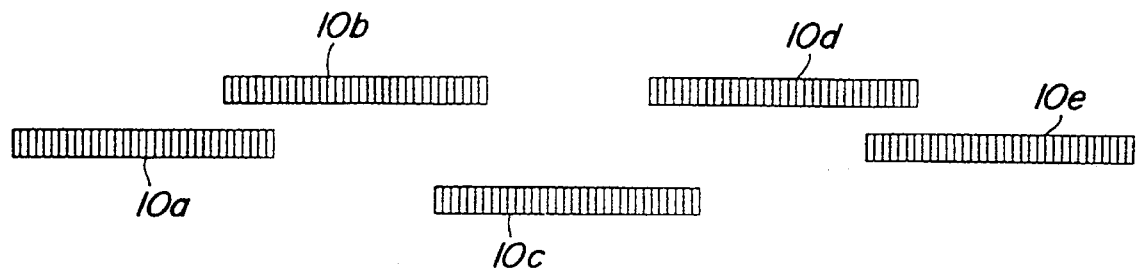

FOCUS DETECTING METHOD AND DISTANCE MEASURING METHOD WITH A PLURALITY OF LIGHT FLUXES AND A CONTRAST OPERATION

BACKGROUND OF THE INVENTION

1. Field of the Invention

The present invention relates to a focus detecting method for estimating a focus condition by using a light flux transmitted through an image forming optical system in an optical instrument such as camera and microscope.

The present invention also relates to a distance measuring method for estimating a distance from an image forming optical system to an object in a distance measuring device installed in a compact camera or automotive vehicles.

2. Related Art Statement

There have been proposed various focus detecting devices for detecting a focus in optical devices such as camera and microscope and an image forming optical system is driven into an in-focused position by using a result of the focus detection. Among these focus detecting devices, there is a focus detecting device, in which a focus is detected by using a light flux transmitted through at least a part of the image forming optical system. This type of focus detecting device has been widely utilized, because there is no parallax in regardless of a distance from the camera to an object, any manufacturing error of an objective lens and any error in a movement of the objective lens toward an in-focused position can be corrected, and a precision of the focus detection can be attained even if the objective lens is exchanged as long as a part of a light flux emanating from the objective lens is made incident upon the focus detecting device. In particular, such a focus detecting device has been predominantly used in a single-lens reflex camera.

A method of detecting a focus condition by using a light flux transmitted through at least a part of the objective lens can be classified into the following two methods:

(1) Phase Difference Method: Two light fluxes transmitted through different portions of the objective lens are focused by a pair of lenses to form two images and focus is detected by estimating a difference in a distribution of light intensity of these images. This method is based on the fact that a distance between the two images is changed in accordance with focus condition.

(2) Contrast Method: A contrast of an image formed by a light flux transmitted through the objective lens is estimated and a position of the objective lens at which a maximum contrast can be attained is detected as an in-focus position.

At first, the phase difference method will be explained with reference to FIG. 1. As illustrated in FIG. 1, a condenser lens 3 is arranged near a predetermined image plane (predetermined focal plane, film conjugate plate) 2 of an image formed by an objective lens 1, a pair of separator lenses 11 are arranged behind the condenser lens 3, said separator lenses being separated from each other by such a distance that a desired precision of focus detection can be attained, and an array of photoelectric converting elements 12 arranged at a focus position of light fluxes emanating from the separator lenses 11.

When the objective lens 1 is in an in-focused position, an image I of an object is formed on the predetermined focal plane 2 and first and second images $I_{01}$ and $I_{02}$ of this image I are formed by the separator lenses 11 on a secondary focal plane which is perpendicular to an optical axis of the objective lens 1 and on which the array of photoelectric converting elements 12 is arranged. However, when the objective lens 1 is at such a position that an image F of the same object is formed at a plane in front of the predetermined focal plane 2, first and second images $F_{01}$ and $F_{02}$ are formed on a plane which is perpendicular to the optical axis and closer to the condenser lens 3 such that the first and second images $F_{01}$ and $F_{02}$ come closer to each other. This condition is generally called a forwardly focused condition. When an image B of the object is formed on a plane behind the condenser lens 3, first and second images $B_{01}$ and $B_{02}$ are formed on a plane behind the predetermined focal plane 12 such that these images are separated from each other in a direction perpendicular to the optical axis. This condition is called a backwardly focused condition. All the first images $I_{01}$, $F_{01}$ and $B_{01}$ are directed upwards and all the second images $I_{02}$, $F_{02}$ and $B_2$ are directed downwards. In the phase difference method, distribution patterns of light intensity of the first and second images on the array of photoelectric converting elements 12 are compared with each other and a focus position is detected by a result of this comparison. Focus detecting optical systems in accordance with the above mentioned phase difference method have been proposed in, for instance Japanese Patent Application Laid-open Publications Kokai Sho Nos. 55-118019, 58-106511 and 60-32012.

Next, the contrast method will be explained with reference to FIGS. 2 and 3. In FIGS. 2 and 3, a condenser lens 3 is arranged in a vicinity of a predetermined focal plane 2 of an objective lens 1 and an image reforming lens 13 is arranged behind the condenser lens 3 to reconstruct an image on an array of photoelectric converting elements 14 which is arranged at a conjugate position with the predetermined focal plane 2. FIG. 2 depicts an in-focused condition, in which a light flux transmitted through the objective lens 1 is focused on the predetermined focal plane 2. FIG. 3 shows a forwardly focused condition in which an focused image of the object is formed at a position before the predetermined position 2. In the in-focused condition, a sharp image of the object is formed on the array of photoelectric converting elements 14, so that the image has a high contrast. In the forwardly focused condition illustrated in FIG. 3, the defocused image is formed on the array of the photoelectric converting elements 14 and thus a contrast is low. Therefore, by moving the objective lens 1 in such a direction that a contrast of the image formed on the array of photoelectric converting elements 14 is increased, the objective lens can be driven into the in-focused position. In Japanese Patent Application Laid-open Publication Kokai Sho 63-127217, there is described that images are formed by a light flux transmitted through the objective lens 1 at positions before and after the predetermined focal plane 2, contrasts of these images are detected, and a focus condition is detected by comparing the thus detected contrasts of the two images. Further, the focal condition may be detected by moving the image reforming lens 13 along the optical axis.

There has been also proposed a camera system, in which a light flux emanating from an object is taken by using a focus detection optical system provided separately from an objective lens and a distance from the camera to the object is detected by processing the thus introduced light flux in accordance with the phase difference method. In this focus detection system, it is unnecessary to provide an optical member for dividing the light flux into image forming light and focus detection light or changing a light path, so that a whole camera system can be made compact and simple and it is particularly suitable for a compact camera system in which an objective lens is not exchanged.

In the focus detecting method based on the phase difference, a precision of focus detection might be decreased materially when an object to be picked-up has a periodic distribution in light intensity. That is, if the object has a fine stripe pattern, the focus condition could not be precisely detected.

In Japanese Patent Application Publication 5-32733, there is proposed a method of reducing a focus detection error or distance detection error for an object having a periodic distribution of light intensity. In this method, a focus detecting optical system is composed of three apertures which are arranged side by side and have different distances between centers of gravity or have different shapes, three image reforming lenses corresponding to said three apertures, and three arrays of photoelectric converting elements corresponding to said three image reforming lenses. Then, output signals from the three arrays of photoelectric converting elements are subjected to a correlation treatment, and a focus condition is detected. In this method, three sets of correlation operation can be performed from the three output signals produced by the three arrays of photoelectric converting elements. When all the three sets of correlation operation indicate an in-focus condition, it is determined that an in-focused condition is attained, but even if only one correlation operation shows a de-focused condition, it is judged that a focus condition could not be detected precisely although one or two remaining correlation operations indicated the in-focused condition. In this manner, it is possible to avoid an error in the focus detection or distance measurement due to a periodic distribution of light intensity.

However, in this known method, it is necessary to derive the three degrees of correlation and to find points having a higher degree of correlation. This point could not be detected by seeking a peak, because the the correlation degree is gradually changed in accordance with a change in a distance between the two images, so that it is necessary to calculate the correlation over a whole range. Therefore, this method requires a quite long time.

Moreover, in the known phase different method, the precision of focus detection is increased when an angle of a center light ray of the light flux to be used for the focus detection is increased. However, when this angle is large, the focus detection could not be performed for an objective lens having a large F-number.

Furthermore, in the known phase difference method, for a limited length of the array of photoelectric converting elements, precision and range of distance measurement are contradictory to each other. That is, when a distance measurement precision is increased, a measurable range is narrowed. Further, a range of distance measurement and a dimension of a field of view are also contradictory to each other.

Moreover, the known phase difference method has a demerit that the focus detection could not be carried out by taking account of influence of aberrations. It has been proposed to previously store information about influence of aberrations for an objective lens and the focus detection procedure is conducted on the basis of the read out information. However, it is practically impossible to store the information of influence of aberrations including manufacturing error and errors in stop positions of lens elements of a zoom lens. Further, it is very difficult to store information about influence of aberrations due to off-axis image.

Moreover, in the known phase difference method, although it is possible to detect a direction of defocusing, an amount of defocus could not be detected.

SUMMARY OF THE INVENTION

The present invention has for its primary object to provide a novel and useful focus detection method, in which a focus condition of an object having a periodic distribution in light intensity can be detected, and direction and amount of defocus can be easily and promptly calculated.

It is another object of the invention to provide a focus detection method, in which a precision of focus detection for an objective lens having a small F-number can be increased, while a focus detection can be performed for an objective lens having a large F-number and direction and amount of defocus can be calculated easily and promptly.

It is another object of the invention to provide a focus detection method, in which a focus condition can be detected precisely over a long range and not only a direction but also an amount of defocus can be detected.

It is still another object of the invention to provide a focus detection method, in which a direction and an amount of defocus can be detected by taking account of influence of aberrations of objective lens.

The present invention also relates to an apparatus for measuring a distance from the apparatus to an object, and has for its object to provide a novel and useful apparatus for measuring a distance to an object having a periodic distribution of light intensity.

According to a first aspect of the invention, a method of detecting a focus condition of an image forming optical system comprises:

a first step for dividing a light flux emanating from an object into a plurality of light fluxes which are transmitted though different regions of a pupil of the image forming optical system, receiving said plurality of light fluxes by a photoelectric converting means having a plurality of light receiving element arrays and deriving plural sets of photoelectrically converted output signals;

a second step for selecting at least two sets of photoelectrically converted output signals among said plural sets of photoelectrically converted output a third step for adding said selected at least two sets of photoelectrically converted output signals at arbitrary positions of respective signals to derive a fist sum signal;

a fourth step for adding said selected at least two sets of photoelectrically converted output signals at positions which are different from those in the third step to derive a second sum signal;

a fifth step for performing contrast operation for said first sum signal to derive a first contrast value and performing contrast operation for said second sum signal to derive a second contrast value; and a sixth step for estimating a focus condition in accordance with said first and second contrast values.

According to a second aspect of the invention, a focus detection method comprises:

a first step for dividing a light flux emanating from an object into a plurality of light fluxes which are transmitted though different regions of a pupil of the image forming optical system, receiving said plurality of light fluxes by a photoelectric converting means having a plurality of light receiving elements and deriving plural sets of photoelectrically converted output signals;

a second step for selecting at least two sets of photoelectrically converted output signals among said plural sets of photoelectrically converted output signals;

a third step for adding said selected at least two sets of photoelectrically converted output signals at arbitrary positions of respective signals to derive a fist sum signal;

a fourth step for adding said selected at least two sets of photoelectrically converted output signals at positions which are different from those in the third step to derive a second sum signal;

a fifth step for performing contrast operation for said first sum signal to derive a first contrast value and performing contrast operation for said second sum signal to derive a second contrast value; and a sixth step for estimating a focus condition in accordance with said first and second contrast values.

BRIEF DESCRIPTION OF THE DRAWINGS

FIG. 1 is a schematical view showing a known phase difference methods;

FIG. 2 is a schematic view illustrating a known contrast method in an in-focused conditions;

FIG. 3 is a schematic view of the known contrast method in a de-focused condition;

FIGS. 5A to 5E are graphs representing relationship between an image position and an amount of light in the in-focused condition while a pupil position is taken as a parameter;

FIGS. 6A to 6E are graphs showing the relationship in the backwardly focused condition;

FIGS. 7A to 7E are graphs depicting the relationship in the forwardly focused condition;

FIG. 8 is a schematic view showing a relationship between the light flux and the photodetector array in the in-focused conditions;

FIG. 9 is a schematic view illustrating the relation in the backwardly focused condition;

FIG. 10 is a schematic view depicting the relationship in the forwardly focused condition;

FIG. 11 is a schematic view representing a relationship between a point on photodetector up to which light is made incident and a light passing position in pupil;

FIGS. 12A to 12E are graphs showing output signals of photodetector arrays for an object having a periodic bright and dark pattern;

FIGS. 13A to 13E are graphs illustrating distributions of light intensity of parallax image summation obtained by adding the output signals shown in FIGS. 12A to 12E after shifting by different amounts;

FIG. 14 is a schematic view depicting a relationship between a cross section of an image forming lens and a sectional area of a pupil;

FIG. 15 a schematic cross sectional view showing a single-lens reflex type camera having a focus detection device performing the focus detection method according to the invention;

FIG. 16 is a schematic cross sectional view illustrating the focus detecting optical system shown in FIG. 15;

FIG. 26 is a schematic view showing a focus detecting optical system depicted in FIG. 25;

FIGS. 27A and 27B are side views illustrating objective lenses having prisms;

FIG. 28 is a perspective view showing the focus detecting optical system composed of the objective lenses shown in FIGS. 27A and 27B; and FIG. 29 is a front view depicting an arrangement of photodetectors used in combination with the focus detecting optical system shown in FIG. 28.

DESCRIPTION OF THE PREFERRED EMBODIMENTS

Figure 4:
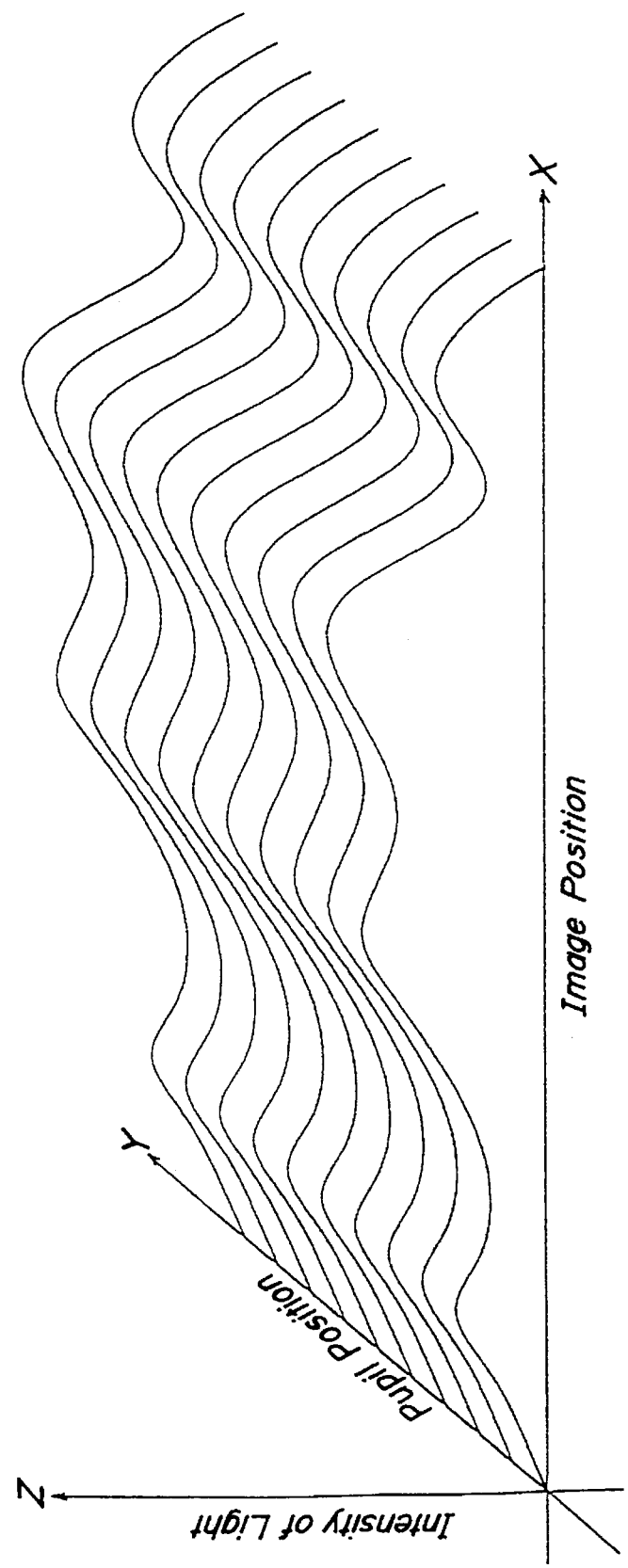
FIG. 4 is a schematic view fro explaining a principle of the focus detection method according to the inventions.

Prior to explaining preferable embodiments of the focus detection method according to the present invention, a principal conception of the present invention will be first explained. Now there is assumed a focus detecting optical system which takes information of an object existing along a one-dimensional direction perpendicular to an optical axis of the focus detecting optical system, and outputs from a photodetector in the focus detecting optical system are expressed by X-Y-Z coordinates. That is, the X axis denotes position information of an image, Y axis represents position information of a region of a pupil through which a light flux is transmitted, and Z axis expresses an amount or intensity of light. X-Z cross sections of a three-dimensional image have the same configuration as shown in FIG. 4 regardless of a position of the Y axis, because these X-Z cross sections represent the same object information. It should be noted that an amount in the Z axis may vary in relation to a total amount of light, but the X-Z cross sections have similar shape. The X-Z cross sections have the same configuration regardless of a position on the Y axis only when the picked-up object and the photodetector are conjugated with each other. Otherwise the configuration of X-Z cross sections deviates in the X axis depending on a position on the Y axis. This means that a focus condition can be detected by estimating this deviation in the configuration of the X-Z cross sections of the three-dimensional image.

The above explained deviation in the configuration of the X-Z cross sections of the three-dimensional image may be estimated by various methods. For instance, the three-dimensional image is projected on the X-Z plane along a line which is set on the X-Y plane and is inclined by an angle $\theta$ with respect to the Y axis, and the deviation may be estimated by detecting a tangent of an angle $\theta$ at which a sharpness or contrast of the thus projected image becomes high. Alternately, the three-dimensional image may be summed along a line which is set on the X-Y plane and is inclined by an angle θ with respect to the Y axis to derive a distribution of intensity of light, and the deviation may be estimated by detecting a tangent of an angle θ at which a sharpness or contrast of the thus obtained distribution. Here, the sharpness means a contrast by taking account of a resolution. In such estimating methods, an amount of defocus is substantially proportional to tanθ. Strictly speaking, a relationship between an amount of defocus and a value of tanθ changes in accordance with a position of an entrance pupil. This will be explained later further in detail. In practice, it should be taken into mind that a dimension of the pupil and photodetector is definite. In FIG. 4, a contrast becomes maximum when tanθ=0. In almost all cases including periodic bright and dark objects, there is produced only one peak in a contrast for tanθ. However, in order to improve an accuracy, there may be set a lower limit for a contrast. Then, it is possible to avoid any focus detection error due to noises of light source and photodetector, and when a uniformly illuminated white wall is existent in a whole field of view, there may be produced an alarm indicating that a correct focus detection could not be performed.

The principal conception of the focus detection method according to the invention will be further explained with reference to an example in which an image formed on a predetermined focal plane is projected onto the photodetector. A light flux emanating from an object is transmitted through an image forming lens or objective lens and is made incident via a predetermined focal plane upon a focus detecting optical system including condenser lens, aperture stops, image reforming lenses, pupil dividing means and photodetecting means. It should be noted that the pupil dividing means may be formed by the aperture stops or image reforming lenses. Now it is assumed that the pupil is equidistantly divided in one direction Y into N portions. For simplicity, these divided portions of the pupil are numbered orderly such that an optical axis passes through a center of a first pupil portion. In this focus detecting optical system, one-dimensional image information is picked-up, and in an embodiment which will be explained later, the image information is picked-up by a linear light receiving element array. This direction is denoted in the X direction. If there is no optical element for folding or bending an optical path, it is desired that the X and Y axes are in parallel with each other in a real space in which the focus detecting optical system is arranged. When it is assumed that there is no problem of eclipse and aberrations and magnifications of respective optical systems corresponding to respective pupil portions are identical with each other, outputs from respective light receiving elements have a same waveform. For instance, center positions of gravity on respective light receiving element arrays upon which light fluxes emanating from a cross point at which the optical axis of the image forming lens intersects with the predetermined focal plane of the image forming lens are made incident via respective pupil portions are denoted as origin of the X axis.

FIGS. 5A to 5E are waveforms of outputs of respective light receiving element arrays upon which images on the predetermined focal plane are made incident through respective pupil portions. In these figures, there are shown only five outputs for the sake of simplicity.

FIGS. 6A to 6E are similar waveforms of the outputs of respective light receiving element arrays when an image on a plane which is shifted with respect to the predetermined focal plane towards the focus detecting optical system. In this case, the outputs are shifted in the direction of X axis from the first pupil portion to Nth pupil portion by, for instance $t_B$ ($t_B>0$).

FIGS. 7A to 7E are similar waveforms of the outputs of respective light receiving element arrays when an image on a plane which is shifted with respect to the predetermined focal plane towards the image forming lens. In this case, the outputs are shifted in the direction of X axis from the first pupil portion to Nth pupil portion by, for instance $t_F$ ($t_F>0$).

Therefore, the focus condition can be estimated by detecting the shift of the outputs of respective light receiving element arrays in the direction X. This is the first conception of the present invention. According to the invention, said shift may be detected by various methods. In a preferable embodiment of the focus detection method according to the invention, the outputs of respective light receiving element arrays are summed while the outputs are shifted on the X axis, and a contrast or sharpness of the thus obtained image information is estimated. Then, an amount of the shift at which the contrast or sharpness becomes peak is sought and an amount of the defocused condition is calculated from the thus detected amount of defocus. This method will be further explained in comparison with the contrast method.

FIG. 8 is a schematic view showing a focus detecting optical system which detects a contrast by means of a linear image sensor. A light flux emanating from a point O on a predetermined focal plane P is focused by a focus detecting optical system L into a single point on a light receiving element array A situating at a position which is conjugate with the predetermined focus plane P. FIG. 9 illustrates the backwardly focused condition. In this defocus condition, a light flux emanating from a point B which is shifted from the predetermined focal plane P towards the focus detecting optical system L is not focused at a single point on the light receiving element array A, but is spread thereon. In this case, a light ray which passes through a point apart from a center of the pupil is made incident upon the array A at a position which is remote from a center of the array. Further, a light ray passing through an upper pupil portion is made incident upon the light receiving element array A at its upper position. Refer to a light ray shown by a thick line. FIG. 10 shows the forwardly focused condition, in which a light flux is also spread on the light receiving element array A. However, in this defocused condition, a light ray passing through an upper pupil portion impinges upon the array at a lower position thereof as shown by a thick line.

FIG. 11 illustrates a relationship between points x on the light receiving element array upon which light fluxes emanating from the points O, B and F and passing through a pupil portion situating at a position y are made incident. A plane of the drawing of FIG. 11 is inherently identical with the X-Y cross section in an imaginary space illustrated in FIG. 4.

FIGS. 12A to 12E show output signals or output characteristics of the light receiving element arrays I+2, I+1, I, I−1 and I−2, respectively when an object having a periodic distribution of light intensity, i.e. an object having a periodic pattern is picked-up. Here, a periodic pitch is denoted as 2*h. In the so-called phase difference method, such an object is liable to cause a focus detection error. Outputs from the arrays I+2, I+1, I, I−1 and I−2 are shifted by 2*h, h, 0, −h and −2*h, respectively and the thus shifted outputs are summed up to derive output characteristic shown in FIG. 13A. FIG. 13B illustrates output characteristic obtained by effecting shifts by h, h/2, 0, −h/2 and −h, respectively, FIG. 13C shows output characteristic in case of no shift, FIG. 13D and 13E illustrate output characteristic when shifts are performed by −h, −h/2, 0, h/2 and h; and −2*h, −h, 0, h, and 2*h; respectively.

Upon comparing the output characteristics shown in FIGS. 13A to 13E, it can be understood that a contract becomes highest when no shift is performed and a contrast becomes lower in accordance with an increase in an amount of the shift. At first, two output characteristics, e.g. a contrast of the output characteristic under not shift and a contrast under an arbitrary output characteristic are estimated and then the thus estimated contracts are compared with each other to judge a direction of defocus, i.e. forwardly focused or backwardly focused. In this manner, an amount of defocus can be calculated by a smaller number of estimations, so that the image forming lens can be driven into an in-focused position within a shorter time period. In this case, the movement of the image forming lens may be initiated at a time at which the judgment for the defocus direction, i.e. forward or backward is performed, so that a time for attaining the in-focused condition can be reduced. This is the second concept of the present invention.

As explained above, the focus detection method according to the invention does not belong neither to the contrast method nor the phase difference method, and may be called a distribution of light intensity of parallax image summation method. By this new method, it is possible to calculate an amount of defocus easily and promptly for an object having a period bright and dark stripe pattern, while a probability of causing a focus detection error and a distance measurement error is very small. In the above explanation, the pupil is divided equidistantly, but according to the invention, the pupil may be divided in a different manner.

Further, when a density of light passing through a pupil portion is weak as compared with a density of light passing through another pupil portion or light is not made incident upon a light receiving element at all, it may be judged that a light transmission through the pupil is not performed completely. Then, outputs from such a light receiving element array are not added or an amount of shift may be corrected or an amount of shift may be weighted. Moreover, the eclipse information may be previously stored instead of detecting it by processing the outputs of the light receiving element array. In the known contrast method and phase difference method, it is impossible to correct the eclipse by processing the outputs of the light receiving element array. Furthermore, when the pupil is not divided equidistantly, the shift amount may be corrected.

According to the invention, the outputs of respective light receiving element arrays may be summed after multiplying them by suitable weights which are determined by considering areas of respective pupil portions and an influence of aberrations of the image forming lens. Now an influence of aberrations of the image forming lens will be explained by taking an on-axis spherical aberration as an example. In principle, an in-focus position is considered to be conjugate with an object, but in practice, the image forming lens has aberrations, so that the in-focus position may be assumed to have a highest density of light flux. FIG. 14 illustrates a cross section of the image forming lens and a shape of the pupil. In general, a pupil for a light flux passing through an optical axis has a circular shape. As can be seen from FIG. 14, when the pupil is divided equidistantly, an area of an outer pupil portion is larger than that of an inner pupil portion. Upon considering the above explained two points, a weight $W_i$ depending a position of pupil portion may be expressed as follows:

$$W_i = |y_i|/q_i \quad (1)$$

wherein $W_i$ is a weight for an output of a light receiving element array which is destined to receive a light flux transmitted through an i-th pupil portion, $y_i$ is a value which is proportional to a distance between a center of gravity of the i-th pupil portion and the optical axis, and $q_i$ is a value which is proportional to an area of the i-th pupil portion. A weight $W_I$ for an output from a pupil portion including the optical axis could not be calculated from the above equation (1), because $y_i$ is zero. In this case, the pupil portion is further divided into upper and lower parts and the weight $W_I$ may be calculated by the following equation (2):

$$W_I = (|y_{IU} * q_{IU}| + |y_{IL} * q_{IL}|)/(q_{IU} + q_{IL})^2 \quad (2)$$

wherein $Y_{IU}$ and $Y_{IL}$ denote values proportional to distances from centers of gravity of said upper and lower parts to the optical axis, and $q_{IU}$ and $q_{IL}$ represent values proportional to areas of said upper and lower parts, respectively.

In practice, the weights may be determined by considering characteristics of optical systems, e.g. attaching importance to contrast and attaching importance to resolving power. Further, aberrations of the image forming lens may be corrected by changing weights. Moreover, the weights $W_i$ may be determined by considering information about eclipse of the pupil. Similar to the known phase difference method, the focus detection method according to the invention may be effectively corrected in accordance with previously stored aberration data. In this case, a spectrum sensitivity may be advantageously mated with the property of the image forming lens.

According to the invention, when the effective magnifications of of the focus detecting optical system corresponding to respective pupil portions are not identical with each other, this may be compensated for. Further an amount of the shift may be corrected in order to correct the aberrations of the focus detecting optical system. This may be expressed by the following equation (3):

$$h(t,x) = \sum_{i=1}^{n} W_i * S_i \{x + b_i * c * (t + \Delta t_i) * (y_i + \Delta y_i)\} \quad (3)$$

wherein $w_i$ is a weight which can be determined on the basis of dimension of pupil portions, positions of center of gravity of respective pupil portions or F-number of the image forming lens, $y_i$ is a component on the Y axis representing a position of a center of gravity of an i-th pupil portion, and c is a constant. It should be noted that $y_i$ is preferably given by a value of a center of gravity of the i-th pupil portion projected onto an entrance pupil of the focus detecting optical system, and the constant c is preferably given as an inverse of a position of the entrance pupil. If the entrance pupil situates at an infinity position, it is preferable to set the $y_i$ and constant c such that $c* y_i$ denotes $\tan\theta_i$, wherein $\theta_i$ is an angle of a light ray passing through a center of gravity of the i-th pupil portion with respect to the optical axis when this light ray is made incident upon the focus detecting optical system. $\Delta t_i$ in the equation (3) denotes a correction value which is given from aberrations of the image forming lens and characteristics of the focus detecting optical system, and may be a function of x. $\Delta y_i$ in the equation (3) represents a correction value given by considering eclipse of pupil and characteristics of the focus detecting optical system. The term $b_i$ expresses an effective magnification of the focus detecting optical system for a light flux passing through the i-th pupil aperture. A function $s_i(x)$ represents an output characteristic of a light receiving element array corresponding to the i-th pupil portion, and x corresponds to a position on the light receiving element array upon which light is made incident. It should be noted that the function $s_i(x)$ may be a distribution characteristic which interpolates the output characteristic of the light receiving element array.

The above mentioned function h(t,x) represents a distribution of light intensity of parallax image summation. A value of t at which a contrast or sharpness of the information obtained by this distribution of intensity of light is derived. Then, an amount of defocus may be obtained by the following equation (4):

$$d = f(t) \quad (4)$$

The function f(t) is substantially determined by a position of the entrance pupil of the focus detecting optical system, and when the entrance pupil situates at an infinity point, d is substantially linearly proportional to t. That is, near the in-focused position, d=t may be set by suitably determining the constant c. When a position of the entrance pupil is taken into consideration, the function f(t) may be expressed by the following equation (5):

$$f(t) = \frac{t * ep}{(ep + t)} \quad (5)$$

wherein ep is a position of the entrance pupil of the focus detecting optical system.

A method of estimating the distribution of light intensity of parallax image summation will be further explained. A method of calculating a contrast on the basis of the distribution of light intensity of parallax image summation defined by the equation (3) may be similar to a method which has been used in the known contrast method, in which the light intensity characteristic of the light receiving element array is estimated. Various methods have been proposed for this purpose, For instance, in NHK Technical Report, Vol. 17, No. 1 (Serial No. 86), 1965, pp. 21 to 37, "AUTOMATIC FOCUS ADJUST OF TELEVISION CAMERA BY MOUNTAI CLIMBING METHOD", a light intensity characteristic, i.e. luminance distribution on a light receiving element array is Fourier transformed to derive a contrast (in this reference, it is referred to a response characteristic for a special frequency or an amplitude of frequency component, and this amplitude of frequency component is estimated as a focus amount). This reference has also proposed a selection of the frequency component.

A method of calculating a sharpness may be also similar to a method used in the known contrast method, in which a sharpness of the light intensity characteristics on the light receiving element array is estimated. There have been also proposed various methods. For instance, Japanese Patent Application Laid-open Publications Kokai Sho Nos. 51-80223 and 56-155909 describe such methods. Further, in Japanese Patent Application Laid-open Publication Kokai Sho 59-155807, there is disclosed a method of deriving a sharpness (in this reference this is called contrast) of the light intensity on a light receiving element array in the phase difference method. In the above mentioned Japanese Patent Application Laid-open Publication Kokai Sho No. 51-80223, the sharpness is detected by deriving the following equation (6):

$$F = \sum_{i=1}^{n} \frac{(P_i - P)^2}{n}, \text{ wherein } P = \frac{1}{n} \sum_{i=1}^{n} P_i \quad (6)$$

wherein P(i) is an electrical signal produced by an i-th light receiving element in the array.

When the sharpness is high, a value F becomes large, and when the sharpness is low, a value F becomes small. Various methods have been proposed to derive a value like as the above value F, which is expressed by a monotonously increasing or decreasing function with respect to the sharpness by summing absolute values of differences of the light intensity between successive equally divided regions or equally separated regions of the light receiving element array. Alternatively, it is possible to use values which are calculated in accordance with a monotonously increasing or decreasing function for absolute values of the differences as described in the above mentioned Japanese Patent Application Laid-open Publication Kokai Sho No. 51-80223.

In the focus detection method according to the invention, for the distribution of light intensity of pallax image summation h(t,x), the light intensity characteristic of this distribution h(t,x) is equally divided into divisions within a given range of x corresponding to a desired field of view; C(t) is calculated by summing absolute values of differences between light intensities of successively adjacent divisions or divisions which are separated from each other by a given number of divisions (alternatively as described in the above mentioned Japanese Patent Application Laid-open Publication Kokai Sho No. 51-80223, values which are calculated by a monotonously increasing or decreasing function for absolute values of the differences); then a value of t at which C(t) becomes maximum is derived; and finally an amount of defocus d is calculated by the equation (4) on the basis of the thus derived value of t. In case of deriving the differences, a value is obtained by integrating or averaging light intensities over a division. Further, the light intensity of the distribution of the parallax image summation h(t,x) may be Fourier transformed to perform a frequency analysis for x, and a contrast C(t) may be derived for a given frequency or a plurality frequencies or a continuous frequency range. Then, a value of t is derived at which the thus derived contrast C(t) becomes maximum and an amount of defocus may be obtained by the thus derived value of t.

DESCRIPTION OF THE PREFERRED EMBODIMENTS

FIG. 15 is a schematic view of a single-lens reflex camera in which the focus detecting optical system for carrying out an embodiment of the focus detection method according to the invention is installed in a lower portion of a camera body, and FIG. 16 is a schematic view illustrating the focus detecting optical system. Near a predetermined focal plane 2 of an image forming lens or objective lens 1 is arranged a condenser lens 3, behind which is provided a mirror 4. Behind the mirror 4, there are arranged five apertures 5a, 5b, 5d and 5e and five image reforming lenses 6a, 6b, 6c, 6d and 6e corresponding to the five apertures, respectively. These apertures 5a, 5b, 5c, 5d and 5e and five image reforming lenses 6a, 6b, 6c, 6d and 6e are arranged perpendicular to a plane of the drawing of FIG. 15. There are further provided five light receiving element arrays 7a, 7b, 7c, 7d and 7e corresponding to the five image reforming lenses 6a, 6b, 6c, 6d and 6e, respectively. These light receiving element arrays 7a, 7b, 7c, 7d and 7e are arranged near image formation positions of the image reforming lenses 6a, 6b, 6c, 6d and 6e, respectively and are aligned perpendicularly to the plane of the drawing of FIG. 15. Light receiving elements of each of the arrays 7a, 7b, 7c, 7d and 7e are also aligned perpendicularly to the plane of the drawing of FIG. 15. Other optical systems of the camera are apparent from the drawing so that they are not explained here.

Figure 17:
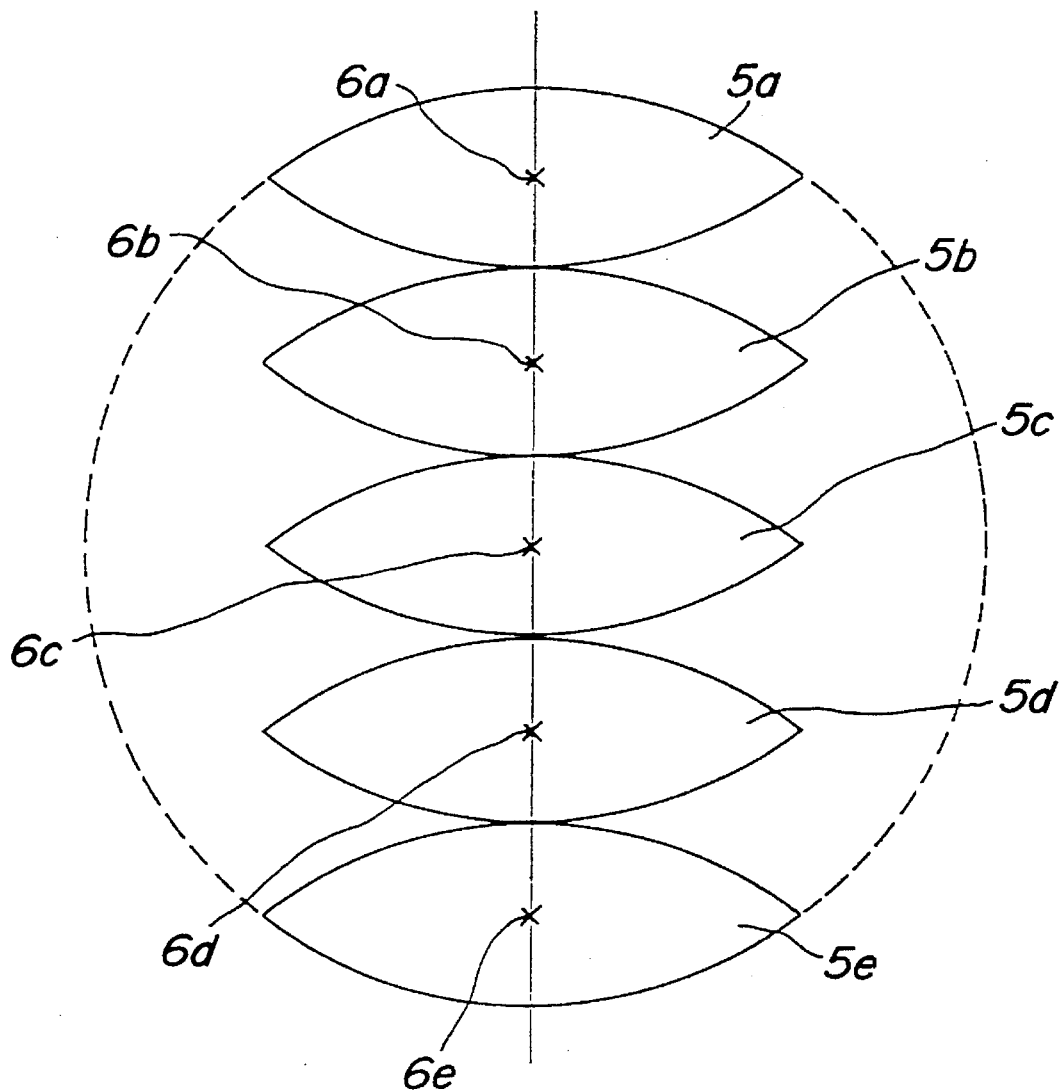
FIG. 17 is a plan view of the focus detecting optical system.

FIG. 17 illustrates the arrangement of the apertures 5a, 5b, 5c, 5d and 5e and vertexes of the image reforming lenses 6a, 6b, 6c, 6d and 6e viewed in an optical axis of the condenser lens 3.

That is, tangents of an angle $\theta_0$ of the outermost light ray, an angle $\theta_1$ of the innermost light ray and an angle $\theta_c$ of a center of gravity of a light flux are shown in the following table.

TABLE 1

| Array | $\tan\theta_0$ | $\tan\theta_1$ | $\tan\theta_c$ |
|---|---|---|---|
| 7a | 0.25 (F 2.0) | 0.15 (F 3.33) | 0.20 (F2.5) |
| 7b | 0.15 (F 3.33) | 0.05 (F10.) | 0.10 (F5.0) |
| 7c | ±0.05 (F10.) | — | 0.00 (—) |
| 7d | −0.15 (F 3.33) | −0.05 (F10.) | −0.10 (F5.0) |
| 7e | −0.25 (F 2.0) | −0.15 (F 3.33) | −0.20 (F2.5) |

Outputs of the light receiving element arrays 7a, 7b, 7c, 7d and 7e are set such that outputs of the distribution of light intensity set on the predetermined focal plane 2 are overlapped with each other, and this output is set as a reference. That is to say, a center position of an output due to a light flux emanating from a point on the optical axis in the predetermined plane 2 is set to x=0. A center position of an output due to a light flux emanating from a point P(1) which is separated by 1 mm in one direction of the aligning direction of the light receiving elements in the array from said point on the optical axis in the predetermined focal plane 2 is set to x=1. A center position of an output due to a light flux emanating from a point P(−1) which is separated by 1 mm in the other direction of the aligning direction from said point on the optical axis in the predetermined focal plane 2 is set to x=−1. In practice, the array is composed of a plurality of light receiving elements so that the output is not continuous, and thus outputs at respective points may be derived by interpolation. The thus obtained output characteristics of the light receiving element arrays 7a, 7b, 7c, 7d and 7e are denoted by Sa(X), Sb(X), Sc(X), Sd(X) and Se(x), respectively. A distance corresponding to a range to be measured is set to, for example −2 mm to 2 mm while the optical axis is considered to be the reference. Then, the distribution of light intensity of the parallax image summation h(t,x) is calculated by the following equation:

$$h(t, x) = S_a(x+y_a*t) + S_b(x+y_b*t) + S_c(x+y_c*t) + S_d(x+y_d*t) + S_e(x+y_e*t) \quad (7)$$

wherein $y_a$=0.2, $y_b$=0.1, $y_c$=0, $y_d$=−0.1 and $y_e$=−0.2. which may be derived form the Table.

In the function h(t,x) obtained by the equation (7), a value of t is derived such that a contrast or sharpness of the distribution of light intensity of parallax image summation becomes maximum within the range to be measured. When the entrance pupil of the focus detecting optical system is infinity, an amount of defocus is given by 1 mm*t. When the entrance pupil of the focus detecting optical system is not infinity, an amount of defocus is also given by 1 mm*t in a vicinity of the in-focused position.

In this case, a range over which a contrast or sharpness is calculated may be narrower than the range to be measured. For instance, a shortest distance to an abject in a field of view may be detected.

When an amount of defocus is large, absolute values of $x+y_a*t$ and $x+y_e*t$ become large, and thus a length of the light receiving element array is too short. In such a case, output characteristics of the light receiving element arrays 7a and 7e may not be summed. Then, a precision, i.e. resolving power of t might be reduced, but the image forming lens may be driven into a substantially in-focused position. If no problem arises on the precision or a short time period for attaining the in-focused position is more important than the precision of focus detection, an exposure may be performed at this state. However, if it is required to obtain a higher precision, a focus detecting operation is restarred from the substantially in-focused position. Then an exposure may be performed under a much higher precision of focus detection. That is to say, under the substantially in-focused position, the absolute values of $x+y_a*t$ and $x+y_e*t$ are small and it is possible to sum up the putout characteristics of the light receiving element arrays 7a and 7e, so that the precision of t can be increased. When F-number of the image forming lens is large such as F 2.8, the extreme apertures 5a and 5e could not transmit the pupil of the image forming lens, and therefore it is not necessary to sum the output characteristics of the light receiving element arrays 7a and 7e. Since F-number is large, there would not practically arise a problem of the precision. Further, when a transmission of the pupil could not be performed, the light receiving element arrays 7a and 7e do not produce any output, and there is no problem in not summing the output characteristics of these arrays. When a transmission of the pupil is partially performed, the output characteristics of the arrays 7a and 7e may be summed by adding correction values to $y_a$ and $y_e$. The correction values may be determined from the stored data of the image forming lens or by comparison with an intensity of the outputs of the light receiving element arrays 7b, 7c and 7d.

Figure 18:
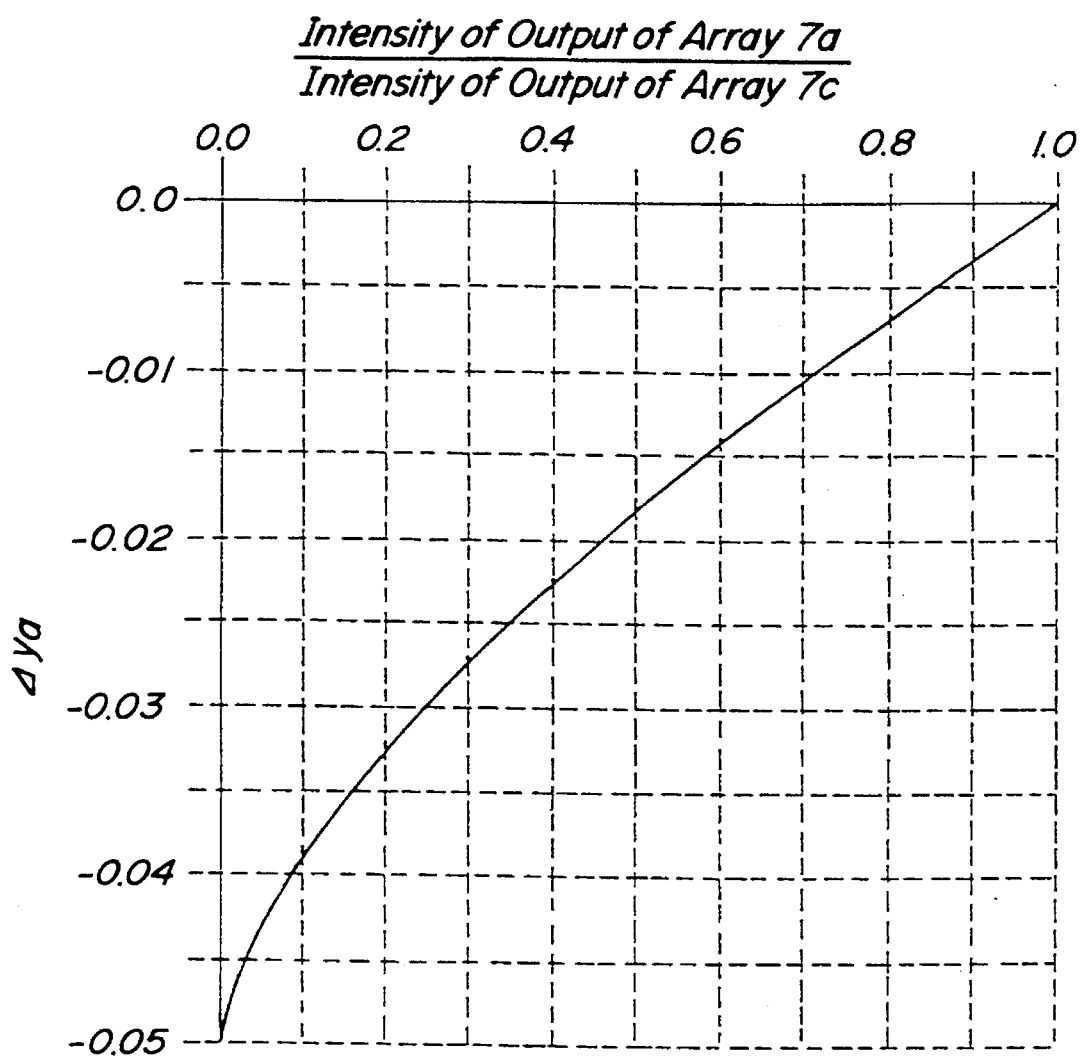
FIG. 18 is a graph representing a relationship between a ratio of outputs of two photodetector arrays and a correction value.
Figure 19:
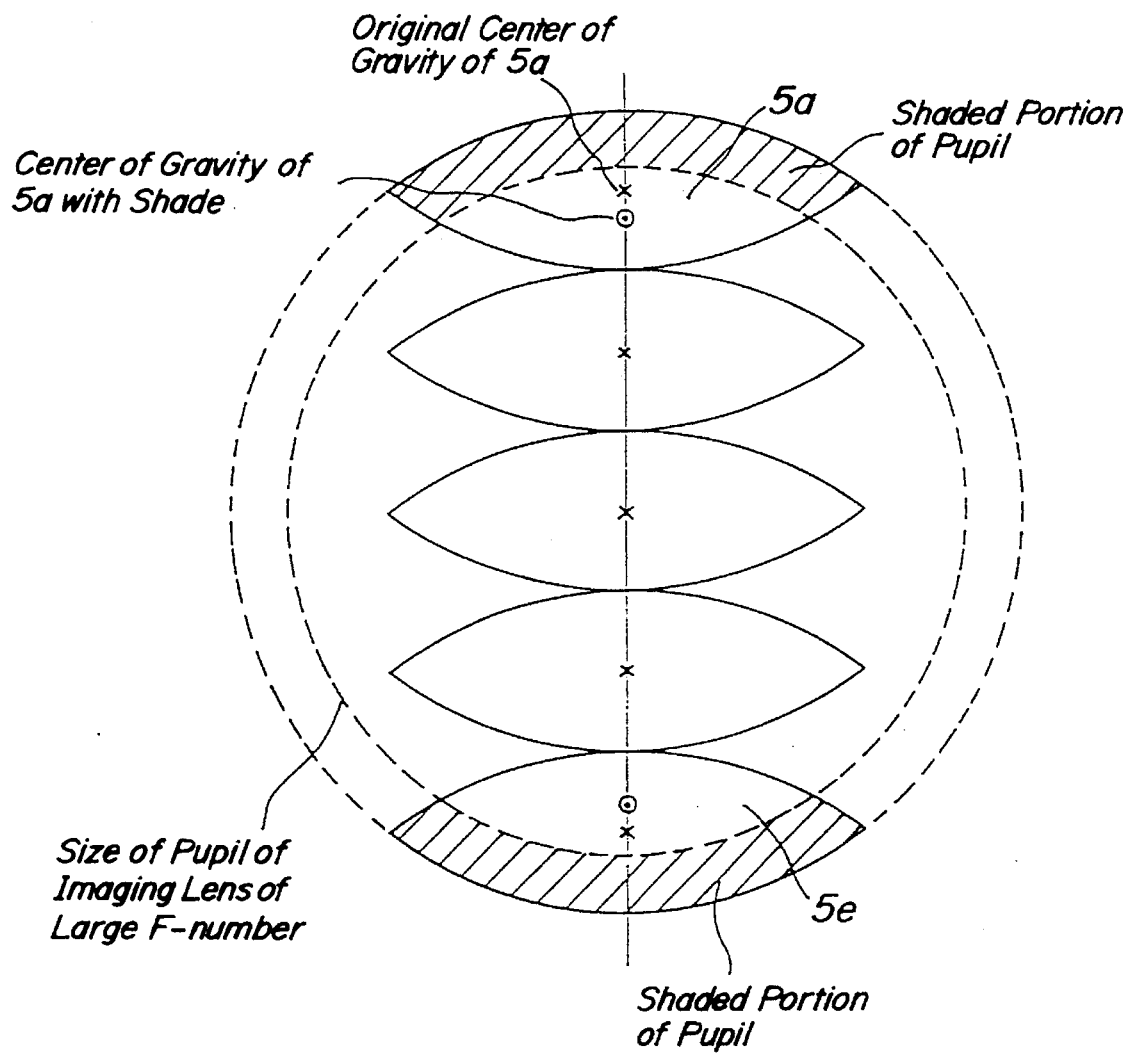
FIG. 19 is a schematic view for explaining an eclipse of image.

FIG. 18 is a graph illustrating a relationship between a ratio of the intensity of the outputs of the light receiving element arrays 7a and 7c and a correction value $\Delta y_a$ for $y_a$. The correction value may be determined in accordance with a ratio of areas of pupil portions corresponding to light receiving element arrays to be compared with each other and a position of a pupil portion to be corrected. In the present embodiment, respective pupil portions have the same dimension. FIG. 19 is a schematic view showing eclipse of the aperture 7a when a ratio of a quantity of light is 1:2. From this figure, a position of a center of gravity of a pupil portion with eclipse is derived and the correction value corresponds to a deviation from a position of a center of gravity of the original pupil portion.

In an initial step of the distance measurement, the distance may be measured by processing the outputs of the light receiving element arrays 7b, 7c and 7d. Although the precision might be decreased, a calculating time may be shortened, because a number of calculating operations is small. Further, a wider defocus range can be detected as explained above. Moreover, in calculating operations except for the value of t at which the maximum contrast can be obtained, there are obtained higher values than those which would be obtained by adding the light desiring element arrays 7a and 7e. Therefore, the desired t can be sought efficiently. Further, in the case of no problem in the precision due to the F-number and in the came in which a shortness of time lag is more important than the precision, exposure may be performed under this condition. In case of requiring a higher precision, after detecting the substantially in-focused condition, the focus detecting process is performed again by including the light receiving element arrays 7a and 7e. In this manner, the in-focused condition can be detected precisely.

Furthermore, when an object to be picked-up is sufficiently bright, the focus detection may be carried out by processing only the outputs of a part of the light receiving element arrays such as 7a, 7b and 7e.

If Sa(X), Sb(X), Sc(X), Sd(X) and Se(x) in the equation (7) are replaced by $S_1(X)$, $S_2(X)$, $S_3(X)$, $S_4(X)$ and $S_5(X)$, the equation (7) may be rewritten into the equation (3). In the present embodiment so far explained, a scale of an output characteristic of a light receiving element array is adjusted so that and a value of $y_1$ is transformed into an angle, and therefore C=1. Areas of respective pupil portions are identical with each other and aberrations of the image forming lens and focus detecting optical system are ignored, so that $\Delta t_1=0$, $\Delta y_1=0$ and $w_1=1$. However, when absolute values of F-number of the image forming lens and t are large, $w_1=0$ and $w_5=0$ or corrected values may be used for $\Delta y_1$ and $\Delta y_5$. It should be noted that values of $\Delta t_1$, $\Delta y_1$ and $w_1$ may be set by considering aberrations of the image forming lens and focus detecting optical system. Alternatively, values of $b_1$ and c may be set in accordance with a manner of processing the output characteristics of the light receiving element arrays and a design of the focus detecting optical system.

Figure 20:
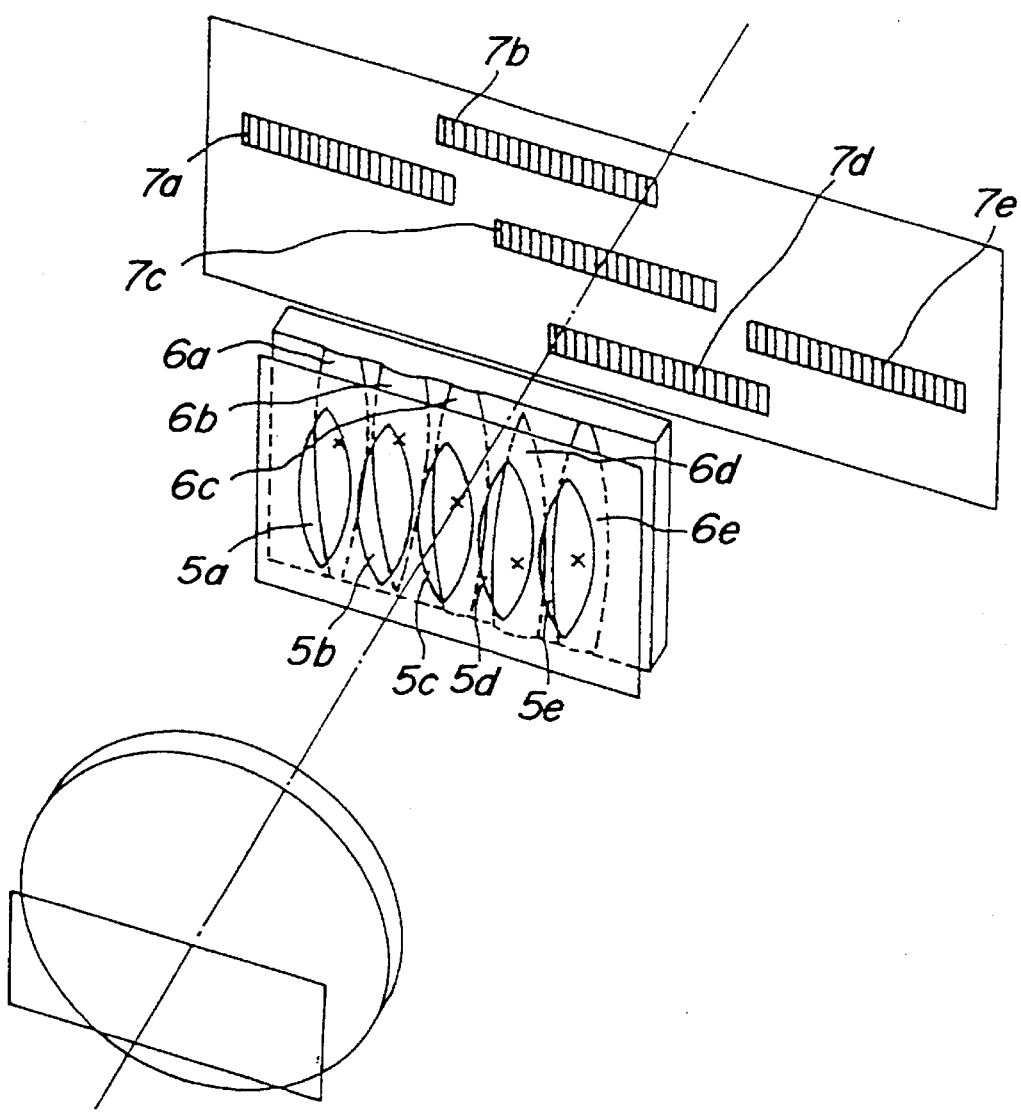
FIG. 20 is a perspective view showing a modified embodiment of the focus detecting optical system.

A layout of the focus detecting optical system shown in FIG. 16 may be modified in a manner illustrated in FIG. 20, in which the light receiving element arrays 7a to 7e are formed as an integrated circuit.

Now, a manner of deriving a value of t at which contrast or sharpness of the distribution of intensity of light of the parallax image summation becomes maximum in the function h(t,x) expressed by the equation (7) will be explained in detail. As stated above, contrast may be derived by Fourier transformation or sharpness may be derived from differences in the distribution of light intensity of the parallax image summation. In the present embodiment, said value t is derived from the sharpness.

Now it is assumed that a range of distance to be measured is from XL to XR and a pitch of the light receiving elements is P. Then, C(t) may be calculated from the following equation (8):

$$C(t) = \sum_{i=XL}^{XR-P} \{h(t,i) - h(t,i+P)\}^2 \quad (8)$$

In this equation, $\Sigma'$ means that i is calculated for respective P.

In the above equation (8), the pitch P of the light receiving elements is used as the distance for calculating the difference, but the present invention is not limited to such an embodiment. A suitable distance may be determined in accordance with the number of light receiving element arrays whose output characteristics are summed and an arrangement of the pupil portions. Further, the distance for calculating the difference may differ from a distance for integration as shown by the following equation (9). In this equation (9), $\Sigma''$ means that i is calculated for respective P', and $P \neq P'$.

$$C(t) = \sum_{i=XL}^{XR-P} \{h(t,i) - h(t,i+P)\}^2 \quad (9)$$

Further, the above equation (9) may be replaced by the following equation (10):

$$C(t) = \sum_{i=XL}^{XR-2*P} \left\{ \int_i^{i+P} h(t,x)dx - \int_i^{i+P} h(t,x+P)dx \right\} \quad (10)$$

Figure 21:
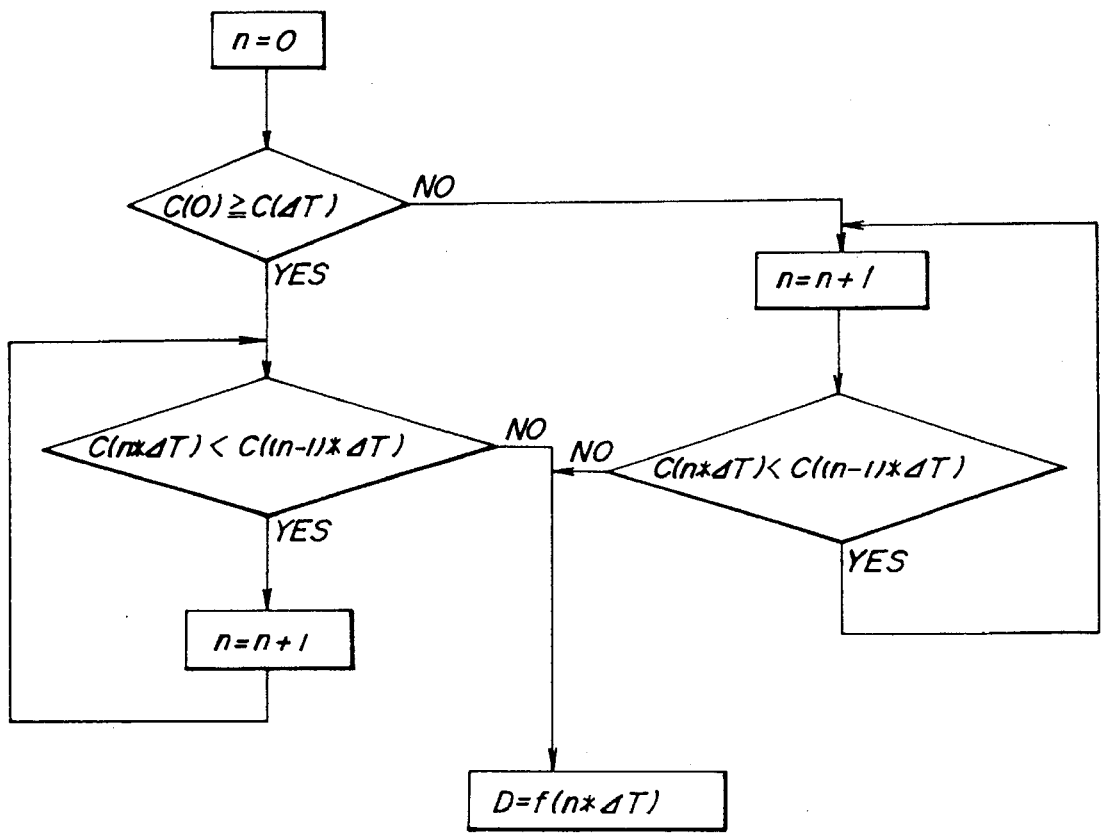
FIG. 21 is a flow chart of operation for detecting an amount of defocus.

A manner of deriving a value of t at which C(t) becomes maximum will be explained. It is assumed that an amount of defocus is derived from the equation (4), a precision of the focus detection is represented by $\Delta d$, $f(0)=0$ and $f(\Delta t) \leq \Delta d$. Then, an amount of defocus is derived in accordance with a flow chart depicted in FIG. 21. Successively obtained values of C(t) are compared with each other to seek the maximum value. This process is similar to the mountain climbing method of the known contrast method. However, the method according to the invention is inherently different from the known method. That is, in the known mountain climbing method, in each comparison the image forming lens or focus detecting lens is moved and a distribution of light intensity on the light receiving element array is read in, but in the method according to the invention, an amount of defocus can be detected by reading the distribution of light intensity on the light receiving element array only once. Therefore, the method according to the invention is superior to the known method, because a detection error due to the movement of the lens is not produced, an energy for driving the lens can be saved, and a focus detection time can be shortened.

Figure 22:
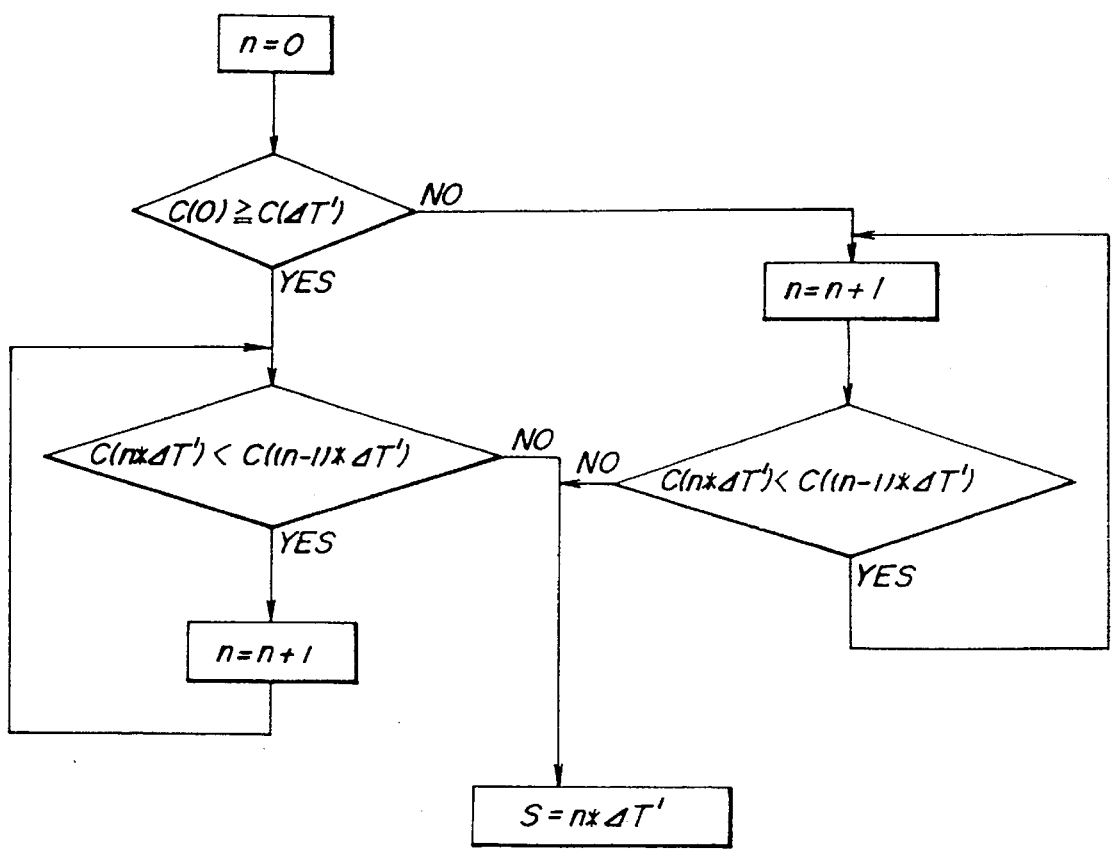
FIG. 22 is a flow chart representing an operation for deriving a position at which a contrast becomes maximum.
Figure 23A:
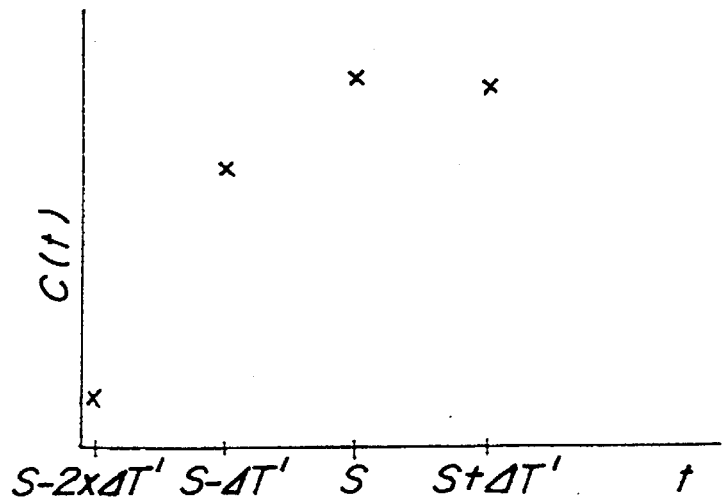
FIGS. 23A to 23C are graphs for explaining a method of performing the interpolation by using a secondary equation.
Figure 23B:
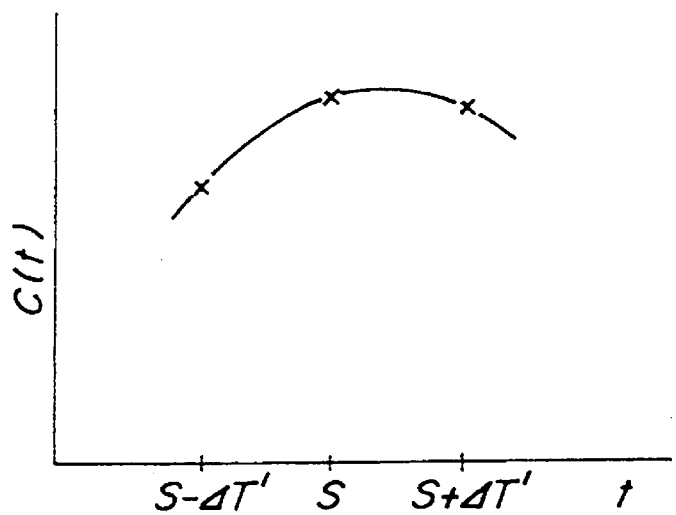
Figure 23C:
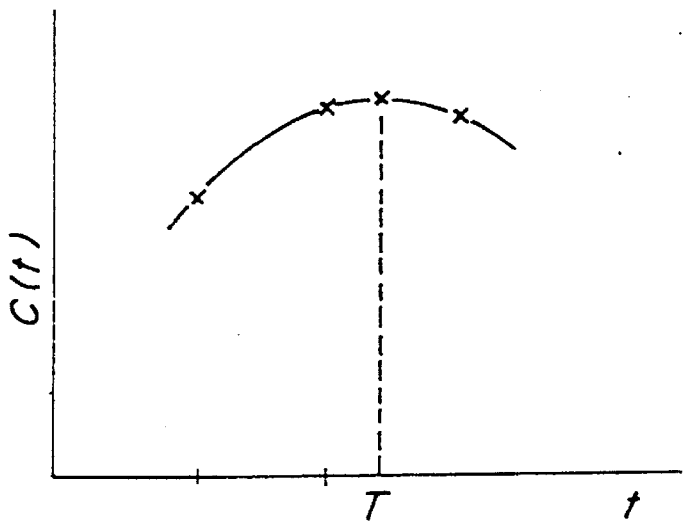

Now another method of deriving the value of t at which a contrast C(t) becomes maximum will be explained. It is first assumed that T represents the value of t attaining the maximum contrast and $\Delta T'$ denotes a suitable interval. Then, S is derived which satisfies conditions of $C(S)>C(S-\Delta T')$ and $C(S)>C(S+\Delta T')$. Such a value of S may be derived by various method. FIG. 22 is a flow chart representing an example of such a method. Then, a value of T for obtaining the maximum is within a range of $S-\Delta T'<T<S+\Delta T'$. In this case, a value of T can be derived by performing interpolation for $C(S-\Delta T')$, $C(S)$ and $C(S+\Delta T')$. For instance, $C(S-\Delta T')$, $C(S)$ and $C(S+\Delta T')$ are obtained as illustrated in FIG. 23A. It is assumed that near T, C(t) is represented by a simple function e.g. a quadratic function of t. Then, C(t) may be expressed as follows:

$$C(t)=E*(t-T)^2+F$$

wherein E and F are constants. This equation means that C(t) has a pole at T as shown in FIG. 23B, Then, the value of t at which a contrast becomes maximum can be derived as T at the pole of the above quadratic function as depicted in FIG. 23C, If $\Delta T'$ is large, it is easy to find S which satisfies the conditions $C(S)>C(S-\Delta T')$ and $C(S)>C(S+\Delta T')$, but in this case a separation of the quadratic function from an actual value becomes large so that a focus detection error might be introduced. This focus detection error can be reduced by performing the above operation by using a smaller $\Delta T'$ on the basis of T which has been obtained by using a larger $\Delta T'$. When a smaller $\Delta T'$ is used, the separation can be decreased. In this case, the once detected distribution of light intensity may be used or after driving the image forming lens in accordance with the focus information obtained by using the larger $\Delta T'$, a new distribution of light intensity may be read in and the focus detection may be carried out by using the smaller $\Delta T'$. The operation for moving the image forming lens in accordance with an amount of defocus obtained by using the larger $\Delta T'$ may be performed simultaneously with the operation for deriving T by using the smaller $\Delta T'$.

Figure 24A:
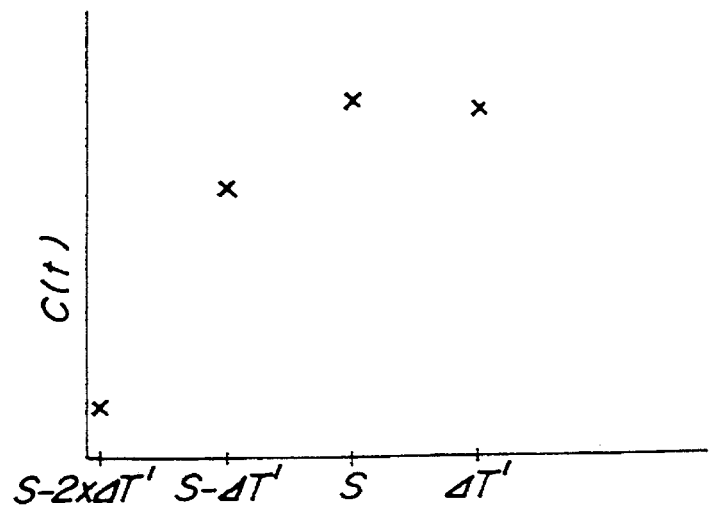
FIGS. 24A to 24C are graphs for explaining another method of performing the interpolation.
Figure 24B:
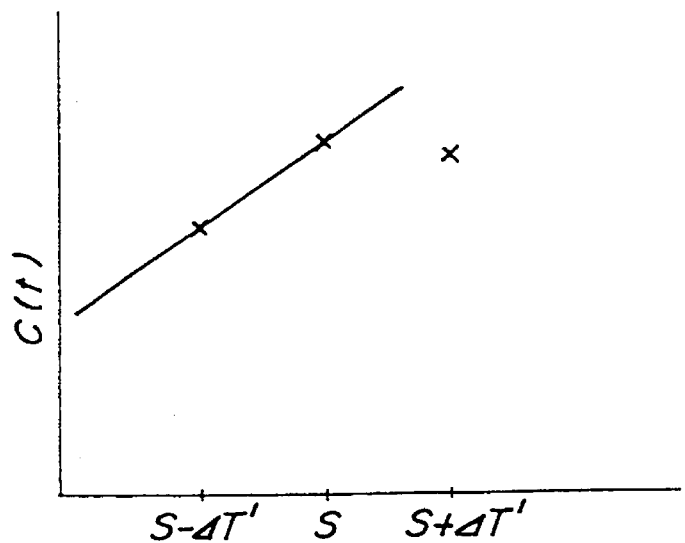
Figure 24C:
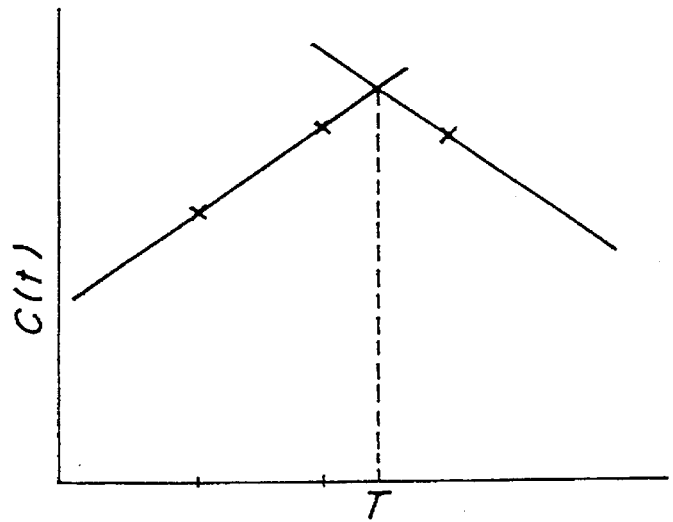

Another interpolating method for deriving T from $C(S-\Delta T')$, $C(S)$ and $C(S+\Delta T')$ will be further explained. It is assumed that $C(S-\Delta T')$, $C(S)$ and $C(S+\Delta T')$ are obtained as illustrated in FIG. 24A. Then, C(t) near T is considered to be expressed by $C(T-x)=C(T+x)$, wherein x is an arbitrary value. Next, the following function C'(t) is considered:

$$C'(t)=G*|t-T|$$

wherein G is a constant. That is to say, as depicted in FIGS. 24B and 24C, G and T are derived from $C(S-\Delta T')$, $C(S)$ and $C(S+\Delta T')$. For instance, when $C(S)>C(S-\Delta T')>C(S+\Delta T')$, G and T may be derived from the following equations (11) and (12):

$$G=\{C(S)-C(S+\Delta T')\}/\Delta T' \quad (11)$$

$$T=0.5*[\Delta T'-\{C(S)-C(S+\Delta T')\}/G] \quad (12)$$

When $\Delta T'$ is large, it Is possible to derive S which satisfies the conditions $C(S)>C(S-\Delta T')$ and $C(S)>C(S+\Delta T')$, but a calculated value of T from the equation C'(t)=G*|t−T| deviates largely from a true value of T, so that the focus detecting precision is reduced. Also in this example, the focus detection error can be decreased by performing the above operation by using a smaller ΔT' on the basis of T which has been obtained by using a larger ΔT'. In this case, the once detected distribution of light intensity may be used or a new distribution of light intensity may be read in and the focus detection may be carried out by using the smaller ΔT'. The operation for moving the image forming lens in accordance with an amount of defocus obtained by using the larger ΔT' and the operation for deriving T by using the smaller ΔT' may be carried out simultaneously. The smaller a difference between C(S−ΔT') and C(S+ΔT') is, the higher the precision of T is, so that an end of the focus detection van be judged in accordance with a magnitude of ΔT' and the difference between C(S−ΔT') and C(S+ΔT').

(SECOND EMBODIMENT)

Figure 25:
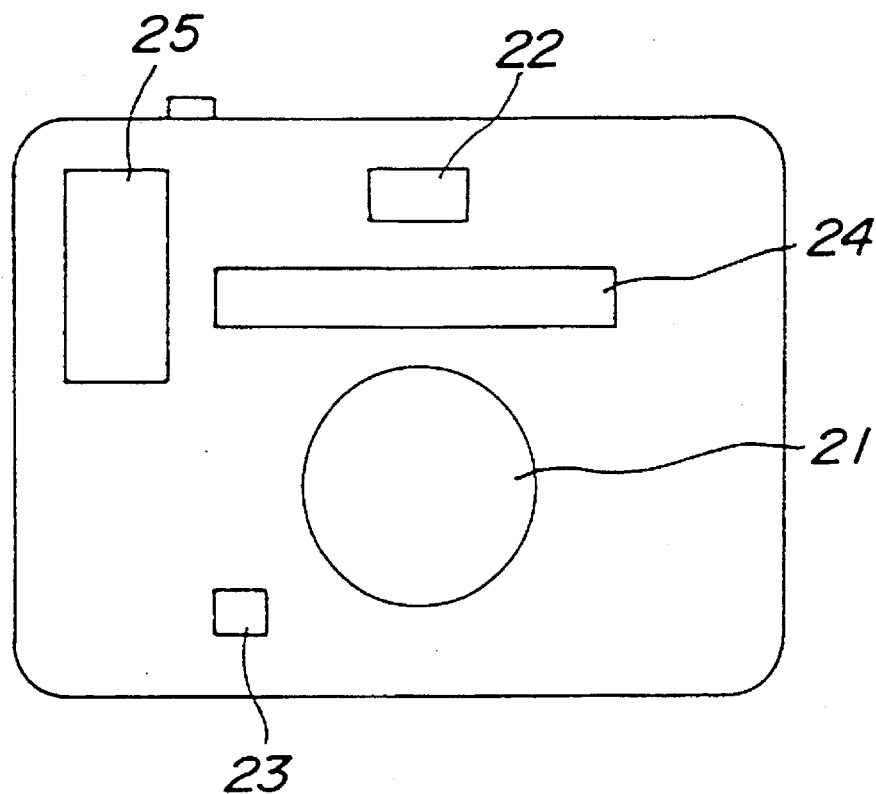
FIG. 25 is a front view of a compact camera to which the focus detection method according to the invention can be advantageously applied.

In a second embodiment, the present invention is applied to an image pick-up device having a focus detecting optical system which is arranged independently from an image forming optical system. FIG. 25 is a front view showing a so-called compact camera of the present embodiment and FIG. 26 is s schematic view illustrating the focus detecting optical system. The camera comprises an image forming lens, i.e. objective lens 21, a view finder window 22, an AE (automatic exposure) window 23, an AF (automatic focus) window 24 and a stroboscope window 25. The objective lens system, view finder optical system and focus detecting optical system are provided independently from each other. The focus detecting optical system comprises aperture stops 8a, 8b, 8c, 8d and 8e arranged along a line, image reforming lenses 9a, 9b, 9c, 9d and 9e each corresponding to respective aperture stops, and light receiving element arrays 10a, 10b, 10c, 10d and 10e each corresponding to respective image reforming lenses. For the sake of simplicity, the aperture stops 8a, 8b, 8c, 8d and 8e have the same shape and are arranged equidistantly with a pitch r. In order to increase a degree of integration of the focus detecting optical system, image reforming lenses including prisms shown in FIGS. 27A and 27B may be arranged as illustrated in FIG. 28. In FIG. 28, each of the image reforming lenses 9a, 9c and 9e is constructed by the lens-prism optical system shown in FIG. 27A and each of the image reforming lenses 9b and 9d is formed by the lens-prism optical system depicted in FIG. 27B. Then, the light receiving element arrays 10a to 10e as illustrated in FIG. 29. In FIG. 28, the image reforming lenses 9a to 9e are formed separately from each other, but they may be formed as a single integral body.

As shown in FIG. 26, a reference plane is set perpendicularly to the optical axis of the image forming lens within a range on a side of an object over which a distance is to be measured. This reference plane may be set to about an imaging magnification of −1/50 to −1/100 in which main object to be picked-up situates. Alternatively the reference plane may be set to a center of a range over which a distance is to be measured by estimating an inverse of this range. For instance, output signals of the light receiving element arrays 10a, 10b, 10c, 10d and 10e are adjusted such that the distribution of light intensity set on the reference plane is superimposed and this output characteristics are set as reference. Now it is assumed that a point of the optical axis of the image forming lens is set as a reference point and a center position of the output due to a light flux emanating from the reference point is set to x=0. A magnification of the reference plane by the image forming lens is denoted as Bf. Therefore, a segment of 1 mm on the reference plane is projected on a film plane as a segment having a length of Bf mm. A center position of an output due to a light flux emanating from a point P(1) which is separated by 1 mm in one direction of the aligning direction of the light receiving elements in the array from said reference point on the reference plane is set to x=1. A center position of an output due to a light flux emanating from a point P(−1) which is separated by 1 mm in the other direction of the aligning direction from said reference point is set to x=−1. Here it is defined that a line connecting a center of the aperture stop 8c and the reference point is a reference axis. In practice, the array is composed of a plurality of light receiving elements so that the output is not continuous, and thus outputs at respective points may be derived by interpolation. The thus obtained output characteristics of the light receiving element arrays 8a, 8b, 8c, 8d and 8e are denoted by Sa(X), Sb(x), Sc(X), Sd(X) and Se(X), respectively. A distance corresponding to a range to be measured is set to, for example −2 mm to 2 mm on the film plane. Then, a length of the range to be measured on the reference plane is 4/Bf. The distribution of light intensity of parallax image summation h(t,x) is then calculated in accordance with the equation (7), wherein $y_a=1$, $y_b=1$, $y_c=0$, $y_d=-1$ and $y_e=-2$.

In the function h(t,x) obtained by the equation (7), a value of t is derived such that a contrast or sharpness of the distribution of light intensity of parallax image summation becomes maximum within the range to be measured. Here, t and an object distance M may be expressed by the following equation:

$$M = \left( \frac{r}{r+t} \right) * 1 \tag{13}$$

In this case, a range over which a contrast or sharpness is calculated may be narrower than the range finding distance, for instance may be set to a shortest object range within a field of view.

Furthermore, if a decrease in the precision may be allowed, a range finding distance may be increased by not adding the outputs of the light receiving element arrays 10a and 10e. That is to say, when a range finding distance it to be increased, absolute values of $y_a*t$ and $y_e*t$ become large, and thus a length of the light receiving element array is too short. However, absolute values of $y_b*t$, $y_b*t$ and are relatively small, and thus the operation could be performed.

If Sa(x), Sb(x), So(X), Sd(X) and Se(X) in the equation (7) are replaced by $S_1(X)$, $S_2(X)$, $S_3(X)$, $S_4(X)$ and $S_5(X)$, the equation (7) may be simplified into the equation (3). In the present embodiment so far explained, a scale of an output characteristic of a light receiving element array is adjusted so that $b_1=1$ and c=1. Since aberrations of the image forming lens and eclipse of image are not taken into mind, $w_i=1$ and $\Delta y_i=0$. Moreover, aberrations of the focus detecting optical system is ignored, $\Delta t_1=0$. However, when a range finding distance is to be widened, $w_i=0$ and $w_5=0$. Alternatively, $\Delta t_i$ may be set by considering aberrations of the focus detesting optical system. Moreover, values of $b_1$ and c may be set in accordance with a manner of processing the output characteristics of the light receiving element arrays and a design of the focus detecting optical system. In the present embodiment, there is disclosed the method of deriving an object distance, i.e. a distance from the camera to the object. However, according to the invention, the equation (13) may be modified such that an amount of movement of the image forming lens can be derived.

Now, a manner of deriving a value of t at which contrast or sharpness of the distribution of intensity of light of parallax image summation defined by the function h(t,x) expressed by the equation (7) becomes maximum will be explained. As stated above, contrast may be derived by Fourier transformation or sharpness may be derived from differences in the distribution of light intensity of parallax image summation. In the present embodiment, said value t is derived from the sharpness.

Now it is assumed that a range of distance to be measured is from XL to XR and a pitch of the light receiving elements is P. Then, C(t) may be calculated from the following equation (14) which is identical with the equation (8):

$$C(t) = \sum_{i=XL}^{XR-P} \{h(t,i) - h(t,i+P)\}^2 \quad (14)$$

In this equation (14), the pitch P of the light receiving elements is used as the distance for calculating the difference, but the present invention is not limited to such an embodiment. A suitable distance may be determined in accordance with the number of light receiving element arrays whose output characteristics are summed up and an arrangement of the pupil portions. Further, the equation (14) may be rewritten as follows:

$$C(t) = \sum_{i=XL}^{XR-2*P} \left\{ \int_i^{i+P} h(t,x)dx - \int_i^{i+P} h(t,x+P')dx \right\} \quad (15)$$

An example of deriving a value of t at which C(t) becomes maximum will be explained. It is assumed that an amount of defocus is derived from the equation (4), a precision of the focus detection is represented by $\Delta d$ and $f'(\Delta t) \leq \Delta d$. Then, an amount of defocus D is derived in accordance with the flow chart depicted in FIG. 21. Successively obtained values of C(t) are compared with each other to seek the maximum value. This process is similar to the mountain climbing method of the known contrast method. However, the method according to the invention is inherently different from the Known method. That is, in the known mountain climbing method, in each comparison the image forming lens or focus detecting lens is moved and a distribution of light intensity on the light receiving element array is read in, but in the method according to the invention, an amount of defocus can be detected by reading the distribution of light intensity on the light receiving element array only once. Therefore, the method according to the invention is superior to the known method, because a detection error due to the movement of the lens is not produced, an energy for driving the lens can be saved, and a focus detection time can be shortened.

Now another method of deriving the value of t at which a contrast C(t) becomes maximum will be explained. It is first assumed that T represents the value of t attaining the maximum contrast and $\Delta T'$ denotes a suitable interval. Then, S is derived which satisfies conditions of $C(S)>C(S-\Delta T')$ and $C(S)>C(S+\Delta T')$. Such a value of S may be derived in accordance with the flow chart shown in FIG. 22 or may be derived by any other methods. Then, a value of T for obtaining the maximum is within a range of $S-\Delta T'<T<S+\Delta T'$.

In this case, said value of t can be derived by performing interpolation for $C(S-\Delta T')$, $C(S)$ and $C(S+\Delta T')$. For instance, C(t) may be assumed to be expressed by a simple quadratic function near T. That is to say, C(t) may be expressed by $C(t)=E*(t-T)^2+F$, wherein E and F are constants. This equation means that C(t) has a pole at T. Then, E, F and T may be derived from the values of $C(S-\Delta T')$, $C(S)$ and $C(S+\Delta T')$. In this manner, the value of t at which a contrast becomes maximum can be derived as T at the pole of the above quadratic function. If $\Delta T'$ is large, it is easy to find S which satisfies the conditions $C(S)>C(S-\Delta T')$ and $C(S)>C(S+\Delta T')$, but in this ease a separation of the quadratic function from an actual value becomes large so that a focus detection error might be introduced. This focus detection error can be reduced by performing the above operation by using a smaller $\Delta T'$ on the basis of T which has been obtained by using a larger $\Delta T'$. When a smaller $\Delta T'$ is used, the separation can be decreased. In this case, the once detected distribution of light intensity may be used or after driving the image forming lens in accordance with the focus information obtained by using the larger $\Delta T'$, a new distribution of light intensity may be read in and the focus detection may be carried out by using the smaller $\Delta T'$. The operation for moving the image forming lens in accordance with an amount of defocus obtained by using the larger $\Delta T'$ may be performed simultaneously with the operation for deriving T by using the smaller $\Delta T'$.

Another interpolating method for deriving T from $C(S-\Delta T')$, $C(S)$ and $C(S+\Delta T')$ will be further explained. C(t) near T is considered to be expressed by $C(T-x)=C(T+x)$, wherein x is an arbitrary value. Next, a function $C'(t)=G*|t-T|$ is considered, wherein G is a constant. That is to say, G and T are derived from $C(S-\Delta T')$, $C(S)$ and $C(S+\Delta T')$. For instance, when $C(S)>C(S-\Delta T')>C(S+\Delta T')$, G and T may be derived from the following equations (16) and (17):

$$G=[C(S)-C(S+T')]/\Delta T' \quad (16)$$

$$T=0.5*[\Delta T'-\{C(S)-C(S-\Delta T')\}/G] \quad (17)$$

When $\Delta T'$ is large, it is possible to derive S which satisfies the conditions $C(S)>C(S-\Delta T')$ and $C(S)>C(S+\Delta T')$, but a calculated value of T from the equation $C'(t)=G*|t-T|$ deviates largely from a true value of T, so that the focus detecting precision is reduced. Also in this example, the focus detection error can be decreased by performing the above operation by using a smaller $\Delta T'$ on the basis of T which has been obtained by using a larger $\Delta T'$. In this case, the once detected distribution of light intensity may be used or a new distribution of light intensity may be read in and the focus detection may be carried out by using the smaller $\Delta T'$. The operation for moving the image forming lens in accordance with an amount of defocus obtained by using the larger $\Delta T'$ and the operation for deriving T by using the smaller $\Delta T'$ may be carried out simultaneously. The smaller a difference between $C(S-\Delta T')$ and is, the higher the precision of T is, so that an end of the focus detection can be judged in accordance with a magnitude of $\Delta T'$ and the difference between $C(S-\Delta T')$ and $C(S+\Delta T')$.

When it is sufficient to judge whether the object distance is near to or far from a predetermined reference distance, for instance, when the image forming lens has only two predetermined positions, the image forming lens may be driven into a near distance position in the case of $C(S-\Delta T')<C(S+\Delta T')$ and the image forming lens may be moved into a far distance position in the case of $C(S-\Delta T')>C(S+\Delta T')$.

As explained above, in the focus detection method according to the invention, a focus detection error for an object having a periodic distribution light intensity can be reduced and a direction and an amount of defocus can be easily derived.

Further, a precision of the focus detection for an image forming lens having a small F-number can be increased, while the focus detection can be performed for an image forming lens having a large F-number and a direction and an amount of defocus can be detected.

Moreover, a focus condition can be precisely detected over a wide range finding distance and a direction and an amount of defocus can be calculated.

A focus condition can be detected at a high precision by calculating a direction and an amount of defocus while influence of aberrations is taken into consideration.

Further, a distance to an object can be measured precisely even if the object has a periodic distribution of light intensity.

Moreover, a distance to an object can be measured with a small error over a wide range.

What is claimed is:

1. A method of detecting a focus condition of an image forming optical system comprising:

a first step for dividing, by means of a pupil dividing optical system, a light flux emanating from an object into a plurality of light fluxes which are transmitted through different regions of a pupil of the image forming optical system, receiving said plurality of light fluxes by a photoelectric converting means having a plurality of light receiving element arrays and deriving plural sets of photoelectrically converted output signals;

a second step for selecting at least two sets of photoelectrically converted output signals among said plural sets of photoelectrically converted output signals;

a third step for adding said selected at least two sets of photoelectrically converted output signals at arbitrary positions of respective signals to derive a first sum signal;

a fourth step for adding said selected at least two sets of photoelectrically converted output signals at positions which are different from said arbitrary positions in the third step to derive a second sum signal;

a fifth step for performing contrast operation for said first sum signal to derive a first contrast value and performing contrast operation for said second sum signal to derive a second contrast value; and a sixth step for detecting a focus condition in accordance with said first and second contrast values.

2. A method according to claim 1, wherein said sixth step of detecting a contrast includes the following sub-steps:

(a) comparing said first and second contrast values obtained in said fifth step and selecting a larger one of the two contrast values as a reference contrast value;

(b) sliding said arbitrary positions of said at least two photoelectric output signals which have been summed to derive said reference contrast value of said at least two contrast values in an opposite direction to said arbitrary positions of said at least two photoelectric output signals which have been summed to derive one of the first and second contrast values which is not the reference contrast value to obtain slid positions, and performing a summing operation and a contrast deriving operation at the slid positions to produce a slid contrast value;

(c) comparing said reference contrast value which has been selected as a reference with said slid contrast value which has been derived by sliding in said step (b) and selecting said slid contrast value as a new reference contrast value as long as the slid contrast value is larger than said reference contrast value, while said second sub-step (b) is repeatedly performed; and (d) determining arbitrary positions of at least two photoelectric output signals which have been used to derive said reference contrast value or a vicinity thereof as an in-focused position when said reference contrast value is larger than said slid contrast value.

3. A method of detecting a focus condition of an image forming optical system comprising:

a first step for dividing, by means of a pupil dividing optical system, a light flux emanating from an object into a plurality of light fluxes which are transmitted through different regions of a pupil of the image forming optical system, receiving said plurality of light fluxes by a photoelectric converting means having a plurality of light receiving element arrays and deriving plural sets of photoelectrically converted output signals;

a second step for selecting at least two sets of photoelectrically converted output signals among said plural sets of photoelectrically converted output signals;

a third step for adding said selected at least two sets of photoelectrically converted output signals at at least three sets of different positions of respective signals to derive at least three sum signals;

a fourth step for performing contrast operation for said at least three sum signals to derive at least three contrast values; and a fifth step for detecting a focus condition in accordance with said at least three contrast values.

4. A method according to claim 3, wherein said fifth step for detecting a focus condition includes a step of deriving a contrast value near a maximum contrast value.

5. A method according to claim 3, wherein said fifth step for detecting a focus condition includes a step of performing an interpolating operation to derive interpolated data and a step of deriving from the interpolated data a position at which a contrast becomes substantially maximum.

6. A method according to claim 3, wherein said fifth step for detecting a focus condition includes a step of deriving a maximum contrast value.

7. A method according to claim 3, wherein in said first step, the light flux is divided into more than four light fluxes.

8. A method according to claim 3, wherein said light flux emanating from the object is divided by the pupil dividing optical system into at least three light fluxes to derive at least three photoelectrically converted output signals.

9. A method according to claim 8, wherein said light flux emanating from the object is divided by the pupil dividing optical system into five light fluxes to produce five sets of photoelectrically converted output signals, said five sets of photoelectrically converted output signals are added at three different positions to derive three sum signals, said three sum signals are processed to derive three contrast values, and a focus condition is detected in accordance with said three contrast values.

10. A method according to claim 9, wherein a peak of the contrast value is calculated from maximum values of said three contrast values.

11. A method according to claim 8, wherein said fifth step for detecting a focus condition includes a step of deriving a maximum contrast value.

12. A method according to claim 9, wherein said fifth step for detecting a focus condition includes a step of deriving a maximum contrast value.

13. A method according to claim 9, wherein said fifth step for detecting a focus condition includes a step of performing an interpolating operation to derive interpolated data and a step of deriving from the interpolated data a position at which a contrast becomes substantially maximum.

14. A method according to claim 10, wherein said fifth step for detecting a focus condition includes a step of performing an interpolating operation to derive interpolated data and a step of deriving from the interpolated data a position at which a contrast becomes substantially maximum.

15. A method according to claim 8, wherein said fifth step for detecting a focus condition includes a step of deriving a contrast value near a maximum contrast value.

16. A method according to claim 9, wherein said fifth step for detecting a focus condition includes a step of deriving a contrast value near a maximum contrast value.

17. A method according to claim 10, wherein said fifth step for detecting a focus condition includes a step of deriving a contrast value near a maximum contrast value.

18. A method according to claim 8, wherein said fifth step for detecting a focus condition includes a step of performing an interpolating operation to derive interpolated data and a step of deriving from the interpolated data a position at which a contrast becomes substantially maximum.

19. A method of measuring a distance to an object in a field of view comprising:

a first step for dividing, by means of a pupil dividing optical system, a light flux emanating from an object into a plurality of light fluxes, receiving said plurality of light fluxes by a photoelectric converting means having a plurality of light receiving element arrays and deriving plural sets of photoelectrically converted output signals;

a second step for selecting at least two sets of photoelectrically converted output signals among said plural sets of photoelectrically converted output signals;

a third step for adding said selected at least two sets of photoelectrically converted output signals at a plurality of arbitrary positions of respective signals to derive a plurality of sum signals;

a fourth step for performing contrast operation for said sum signals to derive a plurality of contrast values; and a fifth step for detecting a distance to the object in accordance with said plurality of contrast values.

20. A method of detecting focus condition of an image of an object formed by an image forming optical system by means of a focus detecting optical system including a plurality of aperture stops for limiting light transmitted through said image forming optical system, a plurality of image reforming lenses each corresponding to respective one of said aperture stops, and a plurality of light receiving element arrays each corresponding to a respective one of said image reforming lenses, said method comprising the following steps of:

receiving by said light receiving element arrays, image information in one direction perpendicular to an optical axis of the focus detecting optical system;

forming a three dimensional image information, while image position information is expressed on an X axis, pupil position information is expressed on a Y axis and light intensity information is expressed on a Z axis, wherein a center on said X axis being set to a position upon which a light ray passing through a center of a predetermined focal plane of said image forming optical system is made incident;

summing information on an X-Z plane of the three dimensional image information in a segment direction assumed on a Y-X plane;

estimating contrast or sharpness from a distribution of light intensity of summed information;

detecting a segment direction assumed on a Y-X plane in which said contrast or sharpness becomes high; and detecting a focus condition of the image in accordance with an angle of said segment direction with respect to the Y axis.

21. A method according to claim 20, wherein said focus detecting optical system comprises a condenser lens arranged near said predetermined focal plane of the image forming optical system, at least three aperture stops, at least three image reforming lenses and at least three light receiving element arrays, wherein distributions of light intensity of light fluxes which have been transmitted through said at least three aperture stops are derived by said at least three light receiving element arrays, the thus obtained distributions of light intensity are shifted in a direction in which light receiving elements are aligned, thus shifted distributions of light intensity are summed, contrast or sharpness of thus obtained summation is estimated, and a focus condition is detected by an amount of shift at which the contrast or sharpness becomes high.

22. A method according to claim 20, wherein said focus detecting optical system comprises a condenser lens arranged near a predetermined focal plane of the image forming optical system, at least three aperture stops, image reforming lenses and light receiving element arrays, distributions of light intensity of light fluxes which have been transmitted through said at least three aperture stops are derived by said at least three light receiving element arrays, the thus obtained distributions of light intensity are shifted in a direction in which light receiving elements are aligned, thus shifted distributions of light intensity are summed, contrast or sharpness of thus obtained summation is estimated, and a distance to the object is detected by an amount of shift at which the contrast or sharpness becomes high.

23. A method according to claim 21, wherein said X axis is set on the predetermined focal plane of the image forming optical system, said light receiving element arrays are arranged such that the distributions of light intensity in the X axis are picked-up, said Y axis is set within a pupil of the focus detecting optical system whose origin is set at a position at which optical axis of the image forming optical system crosses, the pupil is divided along the Y axis into n (where n is an integer larger than 2) aperture portions, an output characteristic of a light receiving element array corresponding to i-th pupil or a distribution of light intensity which is obtained by interpolating the output characteristic of said light receiving element array is expressed by a function $S_i(X)$, an Y axis component of a center of gravity of the i-th pupil is expressed by $y_i$, extreme points of an X axis component of a range over which a distance to be measured are expressed by $X_n$ and $X_p$, a distribution of light intensity of parallax image summation is represented by the following equation:

$$h(t,x) = \sum_{i=1}^{n} W_i * S_i\{x + b_i * c * (t + \Delta t_i) * (y_i + \Delta y_i)\} \quad (3)$$

wherein c is a constant, $W_i$ is a magnitude of respective pupils or a weight given by F-number of the image forming optical system, $\Delta t_i$ is a correction value which is given by aberrations of the image forming optical system and characteristics of the focus detecting optical system, $\Delta y_i$ is a correction value which is given by eclipse of pupil and characteristics of the focus detecting optical system, and $b_i$ is a value representing an effective magnification of the focus detecting; a value of t sought at which contrast or sharpness of said distribution of light intensity of parallax image summation becomes maximum, and an amount of defocus between the in-focus position of the image forming optical system and an focused image or a defocus condition of the image forming optical system is derived from the thus sought value of t.

24. A method according to claim 22, wherein said X axis is set on a plane of an arbitrary object distance, said light receiving element arrays are arranged such that the distributions of light intensity in the X axis are picked-up, said Y axis is set within a pupil of the focus detecting optical system, the pupil is divided along the Y axis into n (where n is an integer larger than 2) aperture portions, an output characteristic of a light receiving element array corresponding to i-th pupil or a distribution of light intensity which is obtained by interpolating the output characteristic of said light receiving element array is expressed by a function $S_i(X)$, an Y axis component of a center of gravity of the i-th pupil is expressed by $y_i$, extreme points of an X axis component of a range over which a distance to be measured are expressed by $X_n$ and $X_p$, a distribution of light intensity of parallax image summation is represented by the following equation:

$$h(t,x) = \sum_{i=1}^{n} W_i * S_i\{x + b_i * c * (t + \Delta t_i) * (y_i + \Delta y_i)\} \quad (3)$$

wherein c is a constant, $W_i$ is a magnitude of respective pupils, $\Delta t_i$ is a correction value which is given by characteristics of the distance measuring optical system, $\Delta y_i$ is a correction value which is given by characteristics of the distance measuring optical system, and $b_i$ is a value determined by a focal length of the distance measuring optical system;

a value of t sought at which contrast or sharpness of said distribution of light intensity of parallax image summation becomes maximum, and a distance to the object is measured in accordance with the thus sought value of t.

25. A method of detecting a focus condition of an image of an object formed by an image forming optical system on a predetermined focal plane comprising the steps of:

dividing a light flux emanating from the object into a plurality of light fluxes which are transmitted though different pupil portions of the image forming optical system, receiving said plurality of light fluxes by a plurality of light receiving element arrays and deriving plural sets of photoelectrically converted output signals;

deriving, from said plural sets of output signals, plural sets of three dimensional image information, each being represented on X-Y-Z coordinates, wherein X axis denoting a position on a light receiving element array, Y axis denoting a position of said pupil portion and Z denoting an intensity of light; and detecting a focus condition of the image of the object formed on the predetermined focal plane by the image forming optical system by detecting a deviation in a direction of X axis of said plural sets of three dimensional image information.

26. A method according to claim 25, wherein said plural sets of three dimensional information are shifted in the direction of X axis, the thus shifted plural sets of three dimensional information are summed to derive a distribution of light intensity of parallax image summation, and the focus condition is detected by deriving a contrast or sharpness of said distribution of light intensity of parallax image summation.

27. A method according to claim 26, wherein an amount of shift at which the contrast or sharpness becomes maximum is detested and a deviation of the image forming optical system from an in-focused position is derived from said detected amount of shift.

28. A method according to claim 26, wherein said contrast or sharpness is derived by considering at least one correction selected from a group consisting of correction given for different pupil portions, correction given by aberrations of the image forming optical system, and correction given by eclipse of pupil portions.

29. A method of detecting a focus condition of an image of an object formed by an image forming optical system on a predetermined focal plane comprising the steps of:

dividing a light flux emanating from the object into a plurality of light fluxes which are transmitted though different pupil portions of the image forming optical system, receiving said plurality of light fluxes by a plurality of light receiving element arrays and deriving plural sets of photoelectrically converted output signals;

deriving a first distribution of light intensity of parallax image summation by shifting said plurality output signals by a first shift amount in a direction in which light receiving elements are aligned and by summing thus shifted output signals;

deriving a second distribution of light intensity of parallax image summation by shifting said plurality of output signals by a second shift amount which is different from said first shift amount in said direction and by summing thus shifted output signals; and comparing the thus derived first and second distributions of light intensity of parallax image summation to derive a direction of defocus.

30. A method of measuring a distance to an object in a field of view by using a distance to an object system including a plurality of aperture stops, a plurality of distance measuring lenses, each corresponding to respective aperture stops, and a plurality of light receiving element arrays, each corresponding to respective distance measuring lenses, said method comprising the steps of:

receiving by said light receiving element arrays, image information in one direction perpendicular to an optical axis of the distance measuring optical system;

forming three dimensional image information, while image position information is expressed on an X axis, pupil position information is expressed on a Y axis and light intensity information is expressed on a Z axis, a center on said X axis being set to a position upon which a light ray passing through a center of a predetermined focal plane of said image forming optical system is made incident;

summing information on an X-Z plane of the three dimensional image information in a segment direction assumed on a Y-X plane;

estimating contrast or sharpness from a distribution of light intensity of summed information;

detecting a segment direction assumed on said Y-X plane in which said contrast or sharpness becomes high; and detecting a distance to the object in accordance with an angle of said segment direction with respect to the Y axis.

* * * * *